United States Patent
Nakajima et al.

(10) Patent No.: US 11,094,452 B2
(45) Date of Patent: Aug. 17, 2021

(54) POWER CONVERTER

(71) Applicant: MITSUBISHI ELECTRIC CORPORATION, Tokyo (JP)

(72) Inventors: Koji Nakajima, Tokyo (JP); Takashi Kumagai, Tokyo (JP); Jun Tahara, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 236 days.

(21) Appl. No.: 15/579,664

(22) PCT Filed: Aug. 4, 2016

(86) PCT No.: PCT/JP2016/072923
§ 371 (c)(1),
(2) Date: Dec. 5, 2017

(87) PCT Pub. No.: WO2017/038369
PCT Pub. Date: Mar. 9, 2017

(65) Prior Publication Data
US 2018/0174739 A1    Jun. 21, 2018

(30) Foreign Application Priority Data

Sep. 1, 2015    (JP) .............................. JP2015-171706

(51) Int. Cl.
*H01F 27/08*    (2006.01)
*H01F 27/28*    (2006.01)
(Continued)

(52) U.S. Cl.
CPC ......... *H01F 27/2876* (2013.01); *H01F 27/02* (2013.01); *H01F 27/24* (2013.01);
(Continued)

(58) Field of Classification Search
CPC ........ H01F 27/32; H01F 27/08; H01F 27/234; H01F 27/2876; H01F 2017/046;
(Continued)

(56) References Cited

U.S. PATENT DOCUMENTS 1,723,840 A * 8/1929 Burnham ............ H01F 27/2847
336/60
1,852,805 A * 4/1932 Frank .................. H01F 27/2847
336/223
(Continued)

FOREIGN PATENT DOCUMENTS

JP    H07-115024 A    5/1995
JP    2004-241536 A    8/2004
(Continued)

OTHER PUBLICATIONS

International Search Report (PCT/ISA/210) dated Oct. 11, 2016, by the Japan Patent Office as the International Searching Authority for International Application No. PCT/JP2016/072923.
(Continued)

*Primary Examiner* — Alexander Talpalatski
*Assistant Examiner* — Joselito S. Baisa
(74) *Attorney, Agent, or Firm* — Buchanan Ingersoll & Rooney PC

(57) ABSTRACT

A power converter includes a magnetic core, a plurality of windings, a plurality of metal sidewalls, a first insulating member, and a second insulating member. The plurality of windings are each wound around the magnetic core and bent to have a portion extending in a direction in which the magnetic core extends. The plurality of metal sidewalls are disposed outside the plurality of windings and extend in the direction in which the magnetic core extends. The first insulating member is disposed between the plurality of windings and between the windings and the magnetic core.
(Continued)

The second insulating member is disposed on an outside of the plurality of windings and in contact with each of the plurality of sidewalls and each of the plurality of windings. The second insulating member has a thermal conductivity higher than a thermal conductivity of the first insulating member.

12 Claims, 13 Drawing Sheets

(51) Int. Cl.
  *H01F 30/10* (2006.01)
  *H02M 3/28* (2006.01)
  *H01F 27/02* (2006.01)
  *H01F 27/24* (2006.01)
  *H01F 27/32* (2006.01)
  *H02M 3/335* (2006.01)
  *H02M 7/06* (2006.01)

(52) U.S. Cl.
  CPC ......... *H01F 27/28* (2013.01); *H01F 27/2847* (2013.01); *H01F 27/32* (2013.01); *H01F 30/10* (2013.01); *H02M 3/28* (2013.01); *H01F 27/085* (2013.01); *H02M 3/33569* (2013.01); *H02M 7/06* (2013.01)

(58) Field of Classification Search
  CPC .... H01F 27/455; H01F 27/2847; H01F 27/02; H01F 27/24; H01F 27/28
  USPC .......................................................... 336/61
  See application file for complete search history.

(56) References Cited

U.S. PATENT DOCUMENTS

| | | | | |
|---|---|---|---|---|
| 4,055,826 A * | 10/1977 | Franz | ................... | H01F 27/306 336/100 |
| 4,342,976 A * | 8/1982 | Ryser | ................... | H01F 19/08 336/84 C |
| 4,538,132 A * | 8/1985 | Hiyama | ................... | H01F 19/04 336/221 |
| 6,594,885 B2 * | 7/2003 | Abdel-Tawab | ....... | H01F 17/045 264/236 |
| 8,288,154 B2 * | 10/2012 | Allen | ................... | C12Q 1/02 435/287.1 |
| 8,907,758 B2 * | 12/2014 | Nomura | ................ | H01F 27/022 336/212 |
| 8,933,774 B2 * | 1/2015 | Yamamoto | ................ | H01F 3/14 336/220 |
| 9,177,713 B2 * | 11/2015 | Kawashima | ........ | H01F 27/2847 |
| 9,287,032 B1 * | 3/2016 | Zweifel | ................. | H02G 3/086 |
| 10,381,151 B2 * | 8/2019 | Shiota | ................. | H01F 27/2823 |
| 2009/0144967 A1 * | 6/2009 | Hasu | ................... | H01F 27/2847 29/605 |
| 2010/0237973 A1 * | 9/2010 | Cheng | ..................... | H01F 41/04 336/83 |
| 2010/0321145 A1 * | 12/2010 | Kaoru | ................. | H01F 27/2847 336/222 |
| 2010/0328893 A1 | 12/2010 | Higashidani et al. | | |
| 2012/0124821 A1 * | 5/2012 | Lungu | ................... | H01F 41/061 29/596 |
| 2012/0126928 A1 * | 5/2012 | Yoshikawa | ........... | H01F 27/306 336/221 |
| 2012/0223794 A1 * | 9/2012 | Asakura | ................... | H01F 27/06 336/65 |
| 2012/0299681 A1 * | 11/2012 | Zajc | ........................ | H01F 27/26 336/180 |
| 2013/0008890 A1 * | 1/2013 | Esaki | .................... | H01F 27/255 219/647 |
| 2013/0333432 A1 * | 12/2013 | Honda | .................. | H01F 41/063 72/66 |
| 2014/0140111 A1 * | 5/2014 | Inaba | ...................... | H01F 37/00 363/37 |
| 2014/0152414 A1 * | 6/2014 | Kawashima | ........ | H01F 27/2847 336/192 |
| 2014/0217642 A1 * | 8/2014 | Suzuki | .................... | B29C 70/68 264/259 |
| 2015/0206647 A1 * | 7/2015 | Chen | .................... | H01F 27/2847 336/223 |

FOREIGN PATENT DOCUMENTS

| | | |
|---|---|---|
| JP | 2009-177019 A | 8/2009 |
| JP | 2011-014669 A | 1/2011 |
| JP | 2014-103168 A | 6/2014 |
| WO | WO 2015/125527 A1 | 8/2015 |

OTHER PUBLICATIONS

Written Opinion (PCT/ISA/237) dated Oct. 11, 2016, by the Japan Patent Office as the International Searching Authority for International Application No. PCT/JP2016/072923.

Office Action dated May 5, 2020, by the German Patent Office in corresponding German Patent Application No. 112016003964.6 and English translation of the Office Action. (16 pages).

* cited by examiner

POWER CONVERTER

TECHNICAL FIELD

The present invention relates to power converters, and particularly relates to a power converter including a magnetic component such as transformer.

BACKGROUND ART

A conventional transformer structure as disclosed for example in Japanese Patent Laying-Open No. 7-115024 (Patent Document 1) includes a primary printed circuit board in which a primary winding is wound around a through hole and a secondary printed circuit board in which a secondary winding is wound around a through hole, the primary and secondary printed circuit boards are stacked together, and two cores are inserted in the through holes. In the transformer structure of Patent Document 1, the primary winding and the secondary winding are held between one core inserted in the direction from the primary printed circuit board and the other core inserted in the direction from the secondary printed circuit board.

Another transformer structure as disclosed for example in Japanese Patent Laying-Open No. 2009-177019 (Patent Document 2) includes a primary winding and a secondary winding wound around a through hole formed in a single flexible circuit board, two cores are inserted in the through hole, and the surface of the flexible circuit board is bent to extend in the direction in which the two cores extend. In the transformer structure of Patent Document 2 as well, the primary winding and the secondary winding are held between one core inserted in the direction from one surface of the flexible circuit board and the other core inserted in the direction from the other surface of the flexible circuit board.

In both the transfer structures, the primary winding and the secondary winding are each formed as a copper foil pattern, and the position of the pattern is fixed by a resin material formed on the circuit board. Accordingly, each of the distance between windings and the distance between the winding and the core is kept at an appropriate value, which enables an electrically insulating state between windings, for example, to be maintained.

CITATION LIST

Patent Document

PTD 1: Japanese Patent Laying-Open No. 7-115024
PTD 2: Japanese Patent Laying-Open No. 2009-177019

SUMMARY OF INVENTION

Technical Problem

Each winding disclosed in Patent Documents 1 and 2 is formed as a copper foil pattern. The winding is therefore thin and has a small conductor cross-sectional area. Large current passed through the winding thus causes a considerably large amount of heat to be generated. According to Patent Documents 1 and 2, however, efficient heat dissipation from each winging appears to be difficult. In particular, although Patent Document 2 has an advantage that the transformer structure is made compact by bending the flexible circuit board, it is difficult to dissipate, to the outside, the heat generated from the secondary winding located relatively closer to the core, namely located inside, as a result of bending of the circuit board.

The present invention has been made in view of the above problems, and an object of the present invention is to provide a power converter that enables all of electrical insulation between the windings, high dissipation of heat from the windings, and downsizing of the entire power converter.

Solution To Problem

A power converter of the present invention includes a magnetic core, a plurality of windings, a plurality of metal sidewalls, a first insulating member, and a second insulating member. The plurality of windings are each wound around the magnetic core and bent to have a portion extending in a direction in which the magnetic core extends. The plurality of metal sidewalls are disposed outside the plurality of windings and extend in the direction in which the magnetic core extends. The first insulating member is disposed between the plurality of windings and between the windings and the magnetic core. The second insulating member is disposed on an outside of the plurality of windings and in contact with each of the plurality of sidewalls and each of the plurality of windings. The second insulating member has a thermal conductivity higher than a thermal conductivity of the first insulating member.

Advantageous Effects of Invention

According to the present invention, the windings are bent to have a portion extending in the direction in which the magnetic core extends, and thus the entire power converter is downsized. Moreover, the first insulating member ensures electrical insulation between the windings and between the windings and the magnetic core. Further, the second insulating member having the high-heat-dissipation property and disposed in contact with both the windings and the sidewalls enables highly efficient dissipation of heat generated from the windings.

DESCRIPTION OF EMBODIMENTS

In the following, embodiments of the present invention are described based on the drawings.

First Embodiment

Figure 1:
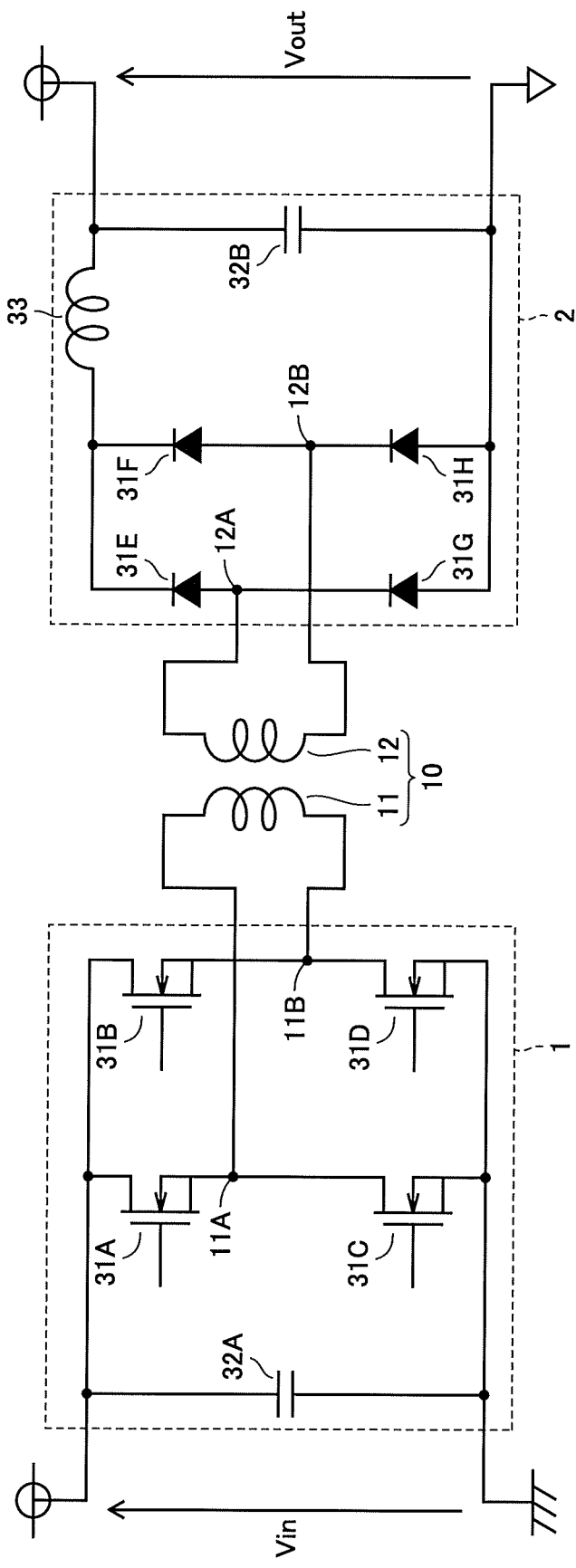
FIG. 1 is a circuit block diagram of a power converter according to an embodiment.

Initially, using FIG. 1, a description is given of an example of a circuit diagram of a power converter in the present embodiment. Referring to FIG. 1, the power converter in the present embodiment mainly includes an input-side drive circuit 1, an output-side drive circuit 2, and a transformer 10.

Input-side drive circuit 1 includes four switching elements 31A, 31B, 31C, 31D, and a capacitor 32A. Output-side drive circuit 2 includes four rectifying elements 31E, 31F, 31G, 31H, a capacitor 32B, and a coil 33. Transformer 10 includes a primary winding 11 and a secondary winding 12.

In input-side drive circuit 1, four switching elements 31A, 31B, 31C, 31D are connected in the manner shown in FIG. 1. Specifically, series-connected switching elements 31A and 31C are connected in parallel with series-connected switching elements 31B and 31D. A connecting point 11A is located between switching element 31A and switching element 31C, and a connecting point 11B is located between switching element 31B and switching element 31D. Primary winding 11 is connected between connecting points 11A and 11B. Switching elements 31A, 31B, 31C, 31D are semiconductor elements such as MOSFET (Metal Oxide Semiconductor Field Effect Transistor) controlled to be alternately turned ON and OFF so as to generate positive and negative voltages on primary winding 11 of transformer 10. The positive and negative voltages generated on primary winding 11 of transformer 10 are determined by input voltage $V_{in}$ applied to capacitor 32A.

In output-side drive circuit 2, four rectifying elements 31E, 31F, 31G, 31H are connected in the manner shown in FIG. 1. Specifically, series-connected rectifying elements 31E and 31G are connected in parallel with series-connected rectifying elements 31F and 31H. Rectifying elements 31E, 31F, 31G, 31H are commonly known diodes, for example. In FIG. 1, the anode of rectifying element 31E is connected to the cathode of rectifying element 31G, and the anode of rectifying element 31F is connected to the cathode of rectifying element 31H.

A connecting point 12A is located between rectifying element 31E and rectifying element 31G, and a connecting point 12B is located between rectifying element 31F and rectifying element 31H. Secondary winding 12 is connected between connecting points 12A and 12B. Rectifying elements 31E, 31F, 31G, 31H thus have a function of rectifying a voltage generated on secondary winding 12 of transformer 10. In output-side drive circuit 2, coil 33 and capacitor 32B are connected and they have a function of smoothing the voltage rectified by rectifying elements 31E, 31F, 31G, 31H. Specifically, one end of coil 33 is connected to respective cathodes of rectifying elements 31E, 31F, and the other end of coil 33 is connected to one end of capacitor 32B. The other end of capacitor 32B is connected to respective anodes of rectifying elements 31G, 31H.

Output voltage $V_{out}$ applied to capacitor 32B is controlled so that output voltage $V_{out}$ is higher than input voltage $V_{in}$ (step up) or lower than input voltage $V_{in}$ (step down), by means of the turns ratio between primary winding 11 and secondary winding 12 forming transformer 10, as well as the ON/OFF time of switching elements 31A, 31B, 31C, 31D.

Next, using FIGS. 2 to 8, a description is given of a specific configuration of the power converter in the present embodiment.

Figure 2:
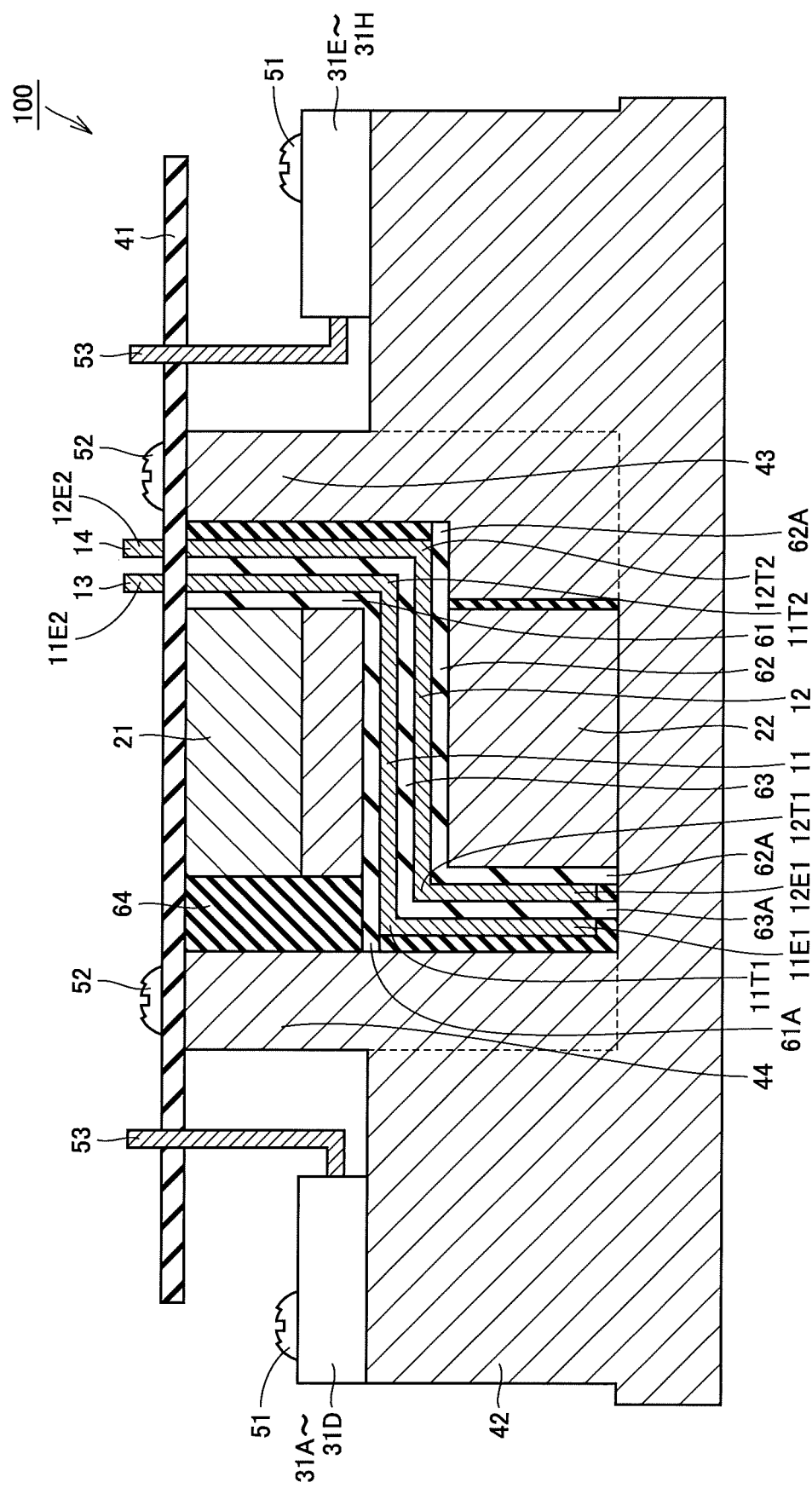
FIG. 2 is a schematic cross-sectional view showing an example of a configuration of a power converter according to a first embodiment.

Referring to FIG. 2, power converter 100 in the present embodiment includes above-described transformer 10. Transformer 10 mainly includes an upper magnetic core 21 and a lower magnetic core 22 that are a pair of magnetic cores, for example, a plurality of windings that are specifically a primary winding 11 and a secondary winding 12, a printed circuit board 41, a casing 42, and sidewalls 43, 44. On primary winding 11 and secondary winding 12, insulating members 61, 62, 63 (first insulating member) and a high-heat-dissipation insulating member 64 (second insulating member) are disposed.

In the present embodiment, a plurality of sidewalls 43, 44 are arranged as a part of casing 42. In other words, casing 42 and a plurality of sidewalls 43, 44 constitute a single body. Sidewall 43 is a region located outward (rightward) of elements such as the magnetic cores and windings 11, 12 in FIG. 2, and extending in a columnar shape in the top-bottom direction (vertical direction) in FIG. 2 like upper magnetic core 21 and lower magnetic core 22. Likewise, sidewall 44 is a region located outward (leftward) of elements such as the magnetic cores and windings 11, 12 in FIG. 2, and extending in a columnar shape in the top-bottom direction (vertical direction) in FIG. 2 like upper magnetic core 21 and lower magnetic core 22. The dotted line in FIG. 2 indicates the boundary between sidewalls 43, 44 of casing 42 and other regions. Casing 42 may be formed through die casting of aluminum, for example, to constitute a single body together with sidewalls 43, 44.

Printed circuit board 41 is a flat-sheet-shaped member serving as a base on which circuits and elements for example included in the whole power converter 100 are mounted and implemented. Specifically, to printed circuit board 41, semiconductor elements such as switching elements 31A to 31D and rectifying elements 31E to 31H shown in FIG. 1 are electrically connected. To printed circuit board 41, capacitors 32A, 32B shown in FIG. 1 (not shown in FIG. 2) as well as elements such as other electronic components are also electrically connected. More specifically, switching elements 31A to 31D and rectifying elements 31E to 31H are secured to casing 42 with screws 51, and electrically connected to printed circuit board 41 through an interconnection 53. Printed circuit board 41 is secured to casing 42 with screws 52, particularly to sidewalls 43, 44 in FIG. 2. Sidewalls 43, 44 thus serve as columns for securing printed circuit board 41 to casing 42 with screws 52.

Upper magnetic core 21 and lower magnetic core 22 are magnetic members arranged to form transformer 10 that is a magnetic component (see FIG. 1). Lower magnetic core 22 is mounted on a part of the region of casing 42, and upper magnetic core 21 is mounted to be superposed on lower magnetic core 22 as seen in plan view (as seen from above in FIG. 2).

The part of casing 42 other than sidewalls 43, 44 serves as a heat dissipater. Specifically, elements such as lower magnetic core 22 are mounted on a part of the region of casing 42, and thus casing 42 is disposed in contact with one end face (lower end face in FIG. 2) of lower magnetic core 22 in the direction in which lower magnetic core 22 extends (top-bottom direction in FIG. 2). The bottom region for example of casing 42 is cooled by air or water, for example, to enable highly efficient dissipation, to the outside, of heat generated from components of transformer 10 and switching elements 31A to 31D for example that are in contact with casing 42.

As described above, a plurality of sidewalls 43, 44 are formed to constitute a single body together with casing 42. Sidewalls 43, 44 are therefore basically made of metal such as aluminum and have the heat dissipation property.

Figure 3:
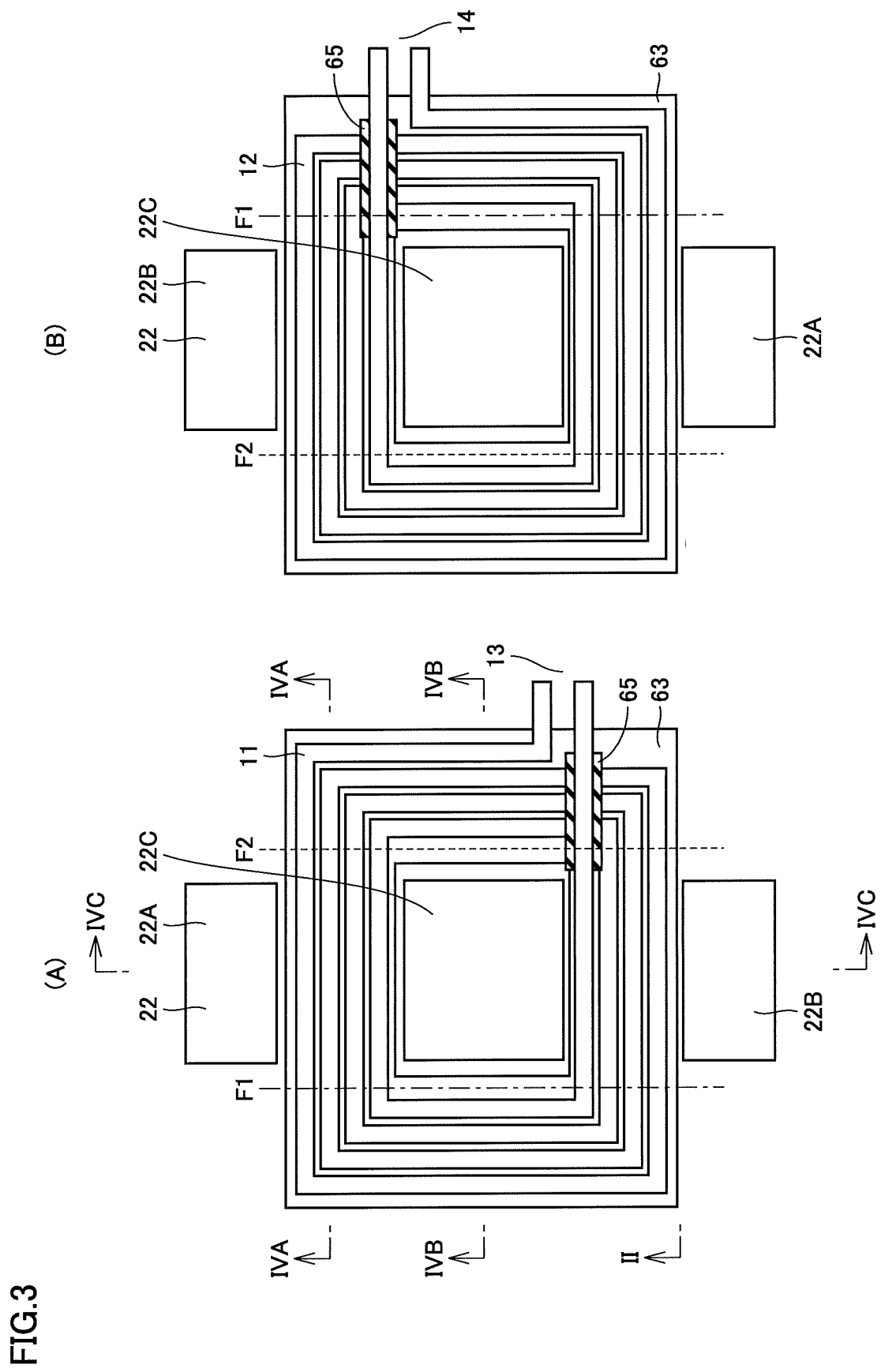
FIG. 3 shows a schematic plan view (A) of a primary winding as seen from above the primary winding, before the primary winding wound around a center leg of a lower magnetic core is bent, and a schematic plan view (B) of a secondary winding as seen from below the secondary winding, before the secondary winding wound around the center leg of the lower magnetic core is bent.
Figure 4:
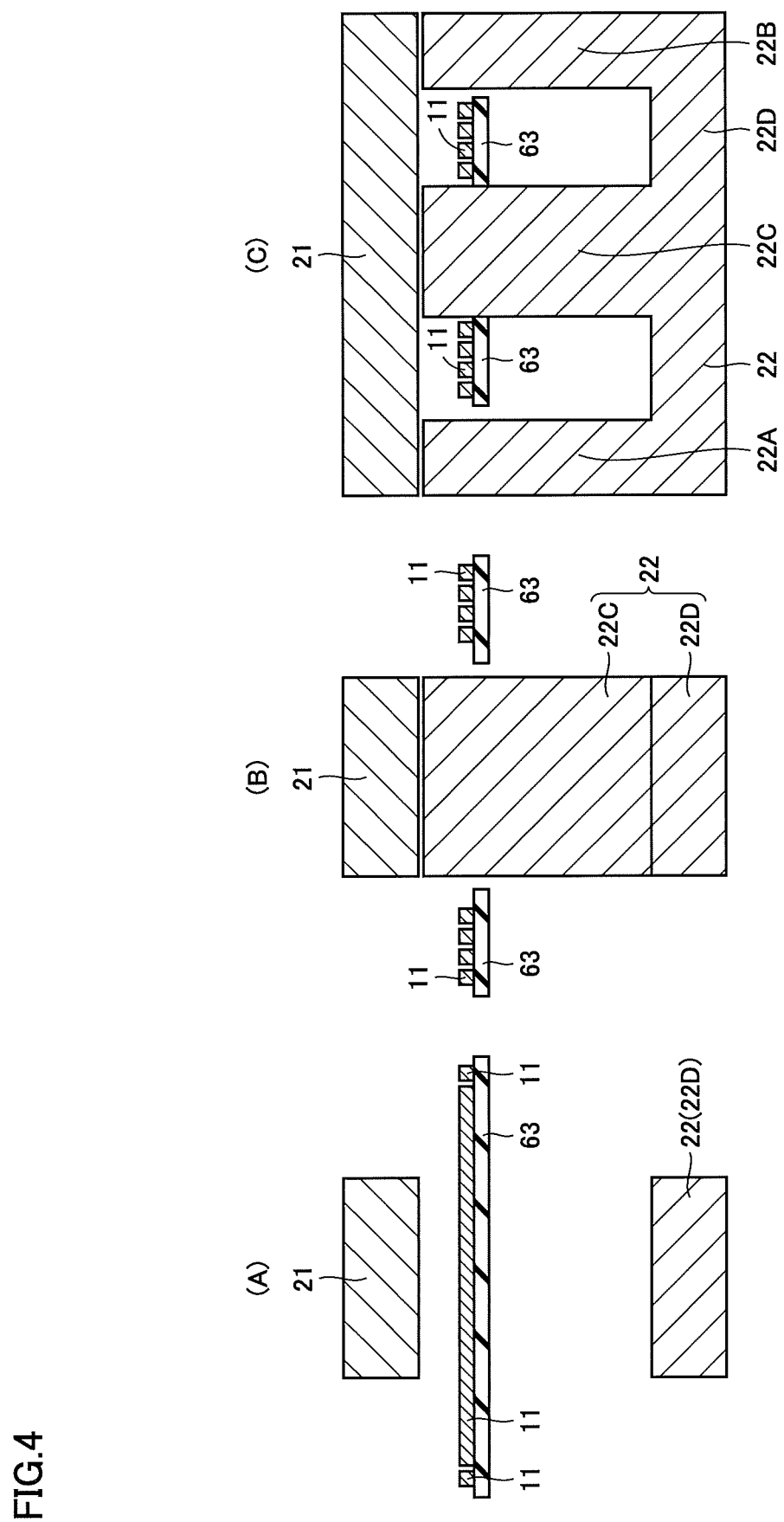
FIG. 4 shows a schematic cross-sectional view (A) along line IVA-IVA in FIG. 3 (A), a schematic cross-sectional view (B) along line IVB-IVB in FIG. 3 (A), and a schematic cross-sectional view (C) along line IVC-IVC in FIG. 3 (A).

For example, referring to FIG. 3 and FIG. 4 (C), upper magnetic core 21 is a so-called I-type core having a rectangular flat-sheet shape, and lower magnetic core 22 is a so-called E-type core including outer legs 22A, 22B, a center leg 22C, and a core coupling portion 22D. For example, referring to FIG. 4 (C), outer legs 22A, 22B and center leg 22C extend in the top-bottom direction in FIG. 4 (C) and core coupling portion 22D extends in the right-left direction in FIG. 4 (C). Center leg 22C is located between outer leg 22A and outer leg 22B and spaced from each of outer leg 22A and outer leg 22B. Core coupling portion 22D forms a single body together with outer legs 22A, 22B and center leg 22C and extends orthogonally to the outer and center legs.

Referring to FIG. 2 and FIG. 3 (A) and (B), a plurality of (two) windings, namely primary winding 11 and secondary winding 12 are particularly wound around center leg 22C that is a part of lower magnetic core 22. In FIG. 3, primary winding 11 and secondary winding 12 each have four turns, by way of example. The number of turns of primary winding 11 and secondary winding 12, however, may be any number.

In each of primary winding 11 and secondary winding 12, turns wound around center leg 22C are spaced from each other. Insulating member 63 is disposed in the region between the turns of primary winding 11 and the turns of secondary winding 12 and outside the outermost portion of primary winding 11 and secondary winding 12.

As shown in FIG. 2, primary winding 11 is wound at a higher level in FIG. 2 (relatively closer to upper magnetic core 21) than secondary winding 12, by way of example, not by way of limitation. For example, secondary winding 12 may be wound at a higher level in FIG. 2 than primary winding 11. In any case, insulating member 63 is located between a plurality of windings, specifically between primary winding 11 (one winding) and secondary winding 12 (the other winding). Insulating member 63 is in contact with both primary winding 11 and secondary winding 12.

FIG. 3 (A) and FIG. 3 (B) show a state of primary winding 11 and secondary winding 12 before being bent along a dashed-dotted line F1 and a dotted line F2 in FIG. 3 (namely only having been wound around center leg 22C). More specifically, referring to FIG. 4 (A), regarding the portion of primary winding 11 for example extending in the right-left direction in FIG. 3 (A), upper magnetic core 21 is disposed directly above (and spaced from) this portion and core coupling portion 22D of lower magnetic core 22 is disposed directly below (and spaced from) this portion. Regarding the right and left ends of this portion of primary winding 11 extending in the right-left direction in FIG. 3 without being bent, upper magnetic core 21 and lower magnetic core 22 are not located directly above and below the right and left ends. Referring to FIG. 4 (B), the portion of primary winding 11 extending in the top-bottom direction in FIG. 3 (A) is disposed in a region outside the region in which upper magnetic core 21 is superposed on lower magnetic core 22. While only primary winding 11 is shown and described, basically the same is applied to secondary winding 12.

Figure 5:
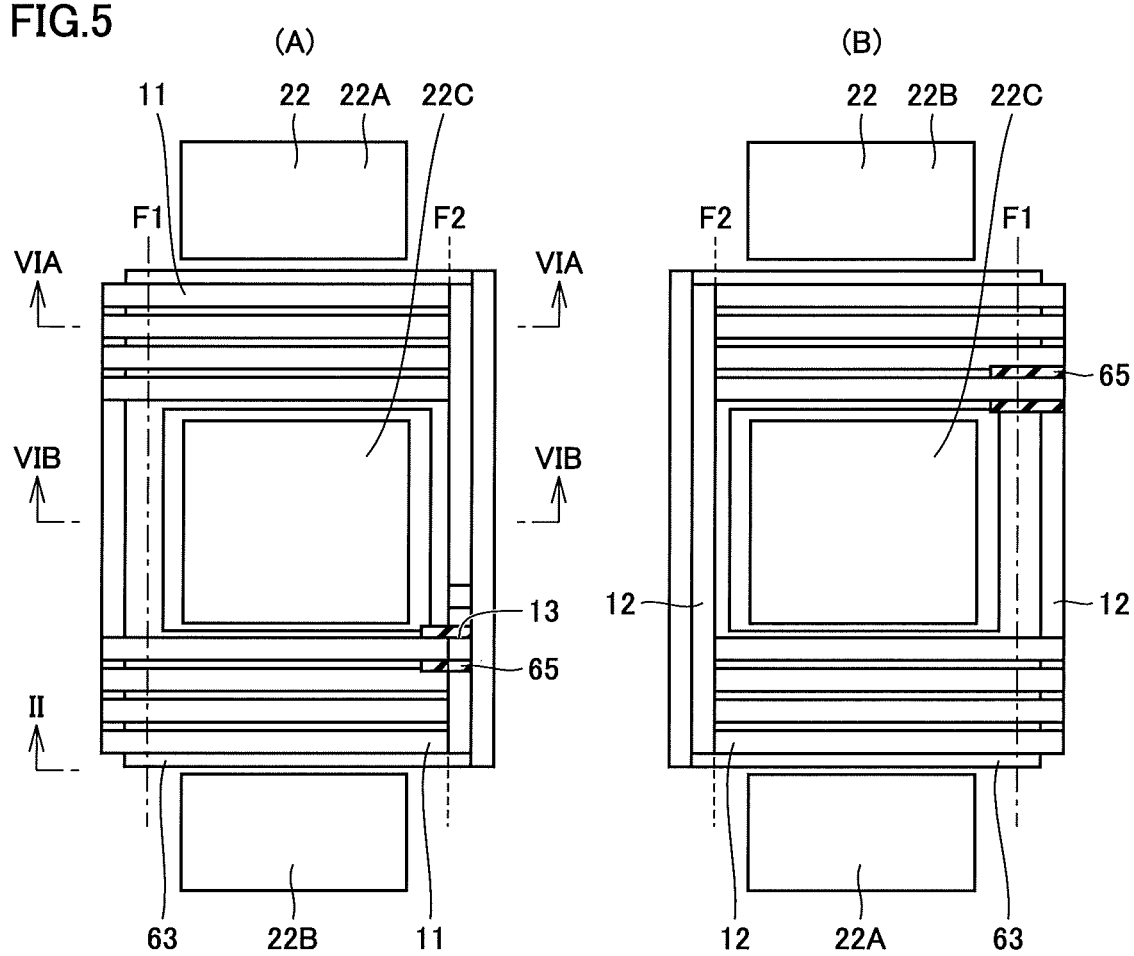
FIG. 5 shows a schematic plan view (A) of the primary winding as seen from above the primary winding, after the primary winding wound around the center leg of the lower magnetic core is bent, and a schematic plan view (B) of the secondary winding as seen from below the secondary winding, after the secondary winding wound around the center leg of the lower magnetic core is bent.
Figure 6:
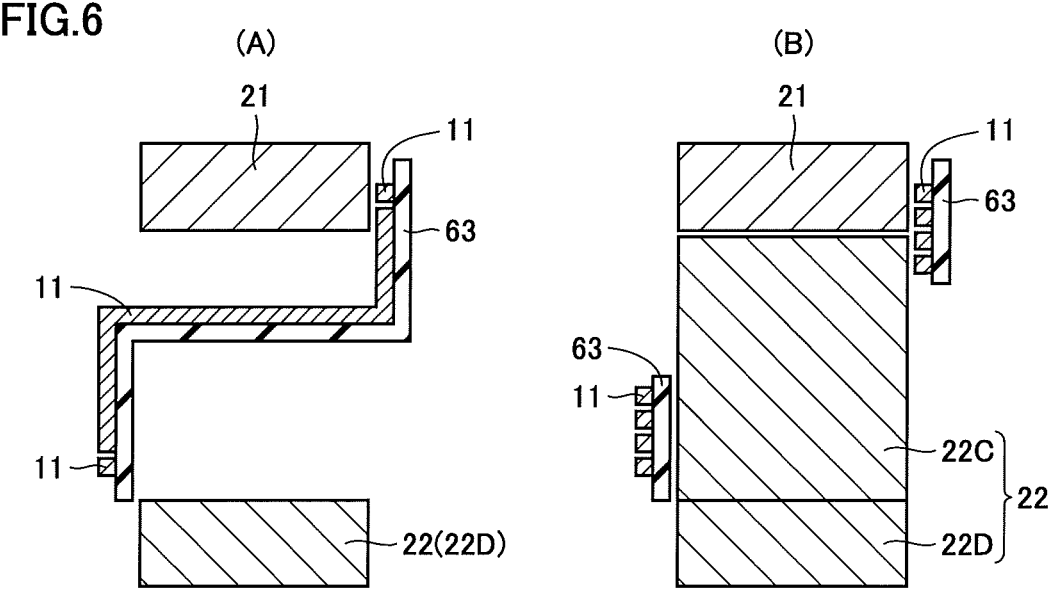
FIG. 6 shows a schematic cross-sectional view (A) along line VIA-VIA in FIG. 5 (A), and a schematic cross-sectional view (B) along line VIB-VIB in FIG. 5 (A).

Referring to FIGS. 5 and 6, primary winding 11 and secondary winding 12 shown in FIGS. 3 and 4 have been bent along dashed-dotted line F1 rearward with respect to the plane of FIGS. 3 and 5 and bent along dotted line F2 frontward with respect to the plane of FIGS. 3 and 5. The region located leftward of dashed-dotted line F1 and the region located rightward of dotted line F2 in FIG. 3 (A) for example are each bent to extend substantially orthogonally to the region located between dashed-dotted line F1 and dotted line F2.

Accordingly, as shown particularly in FIG. 6 (A), the region of primary winding 11 that is located leftward of dashed-dotted line F1 and the region thereof that is located rightward of dotted line F2 in FIG. 3 (A) before primary winding 11 is bent are the regions extending in the direction in which the magnetic cores extend, namely the top-bottom direction in the drawing in which center leg 22C of lower magnetic core 22 extends, and these regions are located on the right side and the left side respectively in FIG. 6 (A). As shown particularly in FIG. 6 (B), the four turns of primary winding 11 are spaced from each other and arranged in the top-bottom direction as seen in the cross-sectional view of FIG. 6. A layer of insulating member 63 is disposed on the side of primary winding 11, namely between primary winding 11 and lower magnetic core 22.

Because primary winding 11, secondary winding 12, upper magnetic core 21, and lower magnetic core 22 are arranged in the manner shown in FIGS. 3 to 6 as described above, actually no cross section shows the manner of arrangement shown in FIG. 2. The manner of arrangement shown in FIG. 2 is rather close to an arrangement in a side view as seen from the position of arrow II in FIG. 3 (A) and FIG. 5 (A) in the direction indicated by arrow II. For the sake of facilitating visual recognition and understanding of the positional relation between primary winding 11, secondary winding 12, upper magnetic core 21, and lower magnetic core 22, a pseudo cross-sectional view like the side view shown in FIG. 2 is also used herein to explain the configuration of power converter 100 in the following embodiments.

Referring again to FIG. 2, two windings, namely primary winding 11 and secondary winding 12 are each bent along dashed-dotted line F1 and dotted line F2 as shown in FIGS. 5 and 6. Accordingly, a first portion and a second portion, as described below, of each of primary winding 11 and secondary winding 12 extend in the top-bottom direction in which magnetic cores 21, 22 extend in FIG. 2. The first portion extends between one end of each winding, namely the bottommost portion thereof in FIG. 2, and a first bent portion at dashed-dotted line F1. The second portion extends between the other end of each winding, namely the topmost portion thereof in FIG. 2, and a second bent portion at dotted line F2. The first portion extends downward in FIG. 2 from the first bent portion, while the second portion extends upward in FIG. 2 from the second bent portion. In other words, the direction in which the first portion extends is opposite to the direction in which the second portion extends. Therefore, in FIG. 2, the two windings, namely primary winding 11 and secondary winding 12, are each bent in so-called S-shape. As primary winding 11 and secondary winding 12 are bent, insulating member 63 held between these windings is also bent at positions corresponding to the first and second bent portions.

In the cross section as shown in FIG. 2, primary winding 11 has a bottommost portion 11E1 and a topmost portion 11E2 in the direction in which magnetic cores 21, 22 extend (top-bottom direction in FIG. 2), and bottommost portion 11E1 and topmost portion 11E2 are herein defined as one end and the other end, respectively. In the cross section in FIG. 2, primary winding 11 has a bent portion relatively closer to bottommost portion 11E1 and a bent portion relatively closer to topmost portion 11E2, and the former bent portion and the latter bent portion are defined as first bent portion 11T1 and second bent portion 11T2, respectively. The region between bottommost portion 11E1 and first bent portion 11T1 is the first portion, and the region between second bent portion 11T2 and the topmost portion 11E2 is the second portion. Likewise, in the cross section as shown in FIG. 2, secondary winding 12 has a bottommost portion 12E1 and a topmost portion 12E2 in the direction in which magnetic cores 21, 22 extend (top-bottom direction in FIG. 2), and bottommost portion 12E1 and topmost portion 12E2 are defined as one end and the other end, respectively. In the cross section in FIG. 2, secondary winding 12 has a bent portion relatively closer to bottommost portion 12E1 and a bent portion relatively closer to topmost portion 12E2, and the former bent portion and the latter bent portion are defined as first bent portion 12T1 and second bent portion 12T2, respectively. The region between bottommost portion 12E1 and first bent portion 12T1 is the first portion, and the region between second bent portion 12T2 and topmost portion 12E2 is the second portion.

As shown in FIG. 2, as a result of the bending in S shape, the first portion of primary winding 11 is located outside the first portion of secondary winding 12, with respect to magnetic cores 21, 22. The second portion of secondary winding 12 is located outside the second portion of primary winding 11, with respect to magnetic cores 21, 22. The two windings each have a region located outside the other winding (the first portion of primary winding 11 and the second portion of secondary winding 12) and this region is in contact with high-heat-dissipation insulating member 64 located outside the region.

The first portion is located leftward of lower magnetic core 22 in FIG. 2, and the second portion is located rightward of lower magnetic core 22 and upper magnetic core 21 in FIG. 2. Respective second portions of primary winding 11 and secondary winding 12 extend through printed circuit board 41 and thereby electrically connect to printed circuit board 41 (to electrode pads or the like (not shown) formed on printed circuit board 41). Primary winding 11 is drawn through printed circuit board 41 to form an extension 13, and secondary winding 12 is drawn therethrough to form an extension 14. Referring again to FIG. 3 (A) and FIG. 3 (B) for example, extensions 13, 14 can be formed by providing insulating members 65 to allow extensions 13 and 14 to cross primary winding 11 and secondary winding 12, respectively, wound around center leg 22C, without being short-circuited with primary winding 11 and secondary winding 12. Insulating member 65 is preferably formed by an insulating tape of polyester or polyimide, or an insulating sheet of silicone material, for example.

An insulating member 61 is disposed between the magnetic cores (upper magnetic core 21 and lower magnetic core 22) and one of the surfaces of primary winding 11 that is opposite to the other surface thereof facing secondary winding 12. Insulating member 61 is in contact with both primary winding 11 and the magnetic cores (upper magnetic core 21 and lower magnetic core 22). An insulating member 62 is disposed between the magnetic core (lower magnetic core 22) and one of the surfaces of secondary winding 12 that is opposite to the other surface thereof facing primary winding 11. Insulating member 62 is in contact with both secondary winding 12 and lower magnetic core 22.

Insulating members 61, 62 are made of the same electrically insulating material as insulating member 63, and formed as the first insulating member. Specifically, insulating members 61, 62, 63 may be bent insulating paper such as aramid paper. Alternatively, insulating members 61, 62, 63 may be formed by molding a resin material such as polyphenylene sulfide or polybutylene terephthalate.

Magnetic cores 21, 22 around which primary winding 11 and secondary winding 12 are wound are mounted on casing 42 and particularly located in a region between a pair of sidewalls 43, 44 serving as support columns. High-heat-dissipation insulating member 64 is disposed outside a plurality of windings (primary winding 11 and secondary winding 12) so as to be in contact with each of a plurality of sidewalls 43, 44 and each of primary winding 11 and secondary winding 12.

High-heat-dissipation insulating member 64 is disposed in the region between upper magnetic core 21/lower magnetic core 22 (higher than the region in which primary winding 11 and secondary winding 12 extend horizontally) and sidewall 44 located leftward of upper and lower magnetic cores 21, 22, and disposed in the region between lower magnetic core 22 (lower than the region in which primary winding 11 and secondary winding 12 extend horizontally) and sidewall 43 located rightward of lower magnetic core 22. In other words, high-heat-dissipation insulating member 64 is disposed between sidewalls 43, 44 and magnetic cores 21, 22, so that each of sidewalls 43, 44 and magnetic cores 21, 22 is at least partially in contact with high-heat-dissipation insulating member 64.

High-heat-dissipation insulating member 64 is also disposed in the region between the first portion of primary winding 11 and sidewall 44 located outside, namely leftward of the first portion, and disposed in the region between the second portion of secondary winding 12 and sidewall 43 located outside, namely rightward of the second portion. In other words, high-heat-dissipation insulating member 64 is disposed between sidewalls 43, 44 and primary and secondary windings 11, 12, so that each of sidewalls 43, 44 and primary and secondary windings 11, 12 is at least partially in contact with high-heat-dissipation insulating member 64.

In other words, high-heat-dissipation insulating member 64 is disposed on only the outside of each of primary winding 11, secondary winding 12, and magnetic cores 21, 22. The feature that high-heat-dissipation insulating member 64 is disposed on the outside herein means that, at a position (coordinates) with respect to the top-bottom direction in FIG. 2, high-heat-dissipation insulating member 64 is located outward of primary winding 11/secondary winding 12 with respect to magnetic core(s) 21, 22. In a region directly above respective first portions of primary and secondary windings 11, 12, for example, high-heat-dissipation insulating member 64 may be partially located somewhat inside primary winding 11 and secondary winding 12. This arrangement, however, is herein not regarded as an arrangement in which high-heat-dissipation insulating member 64 is located inside primary winding 11 and secondary winding 12. Each of the two windings, namely primary winding 11 and secondary winding 12, having the first and second bent portions is disposed partially in contact with high-heat-dissipation insulating member 64. Specifically, the first portion of primary winding 11 is disposed in contact with high-heat-dissipation insulating member 64, and the second portion of secondary winding 12 is disposed in contact with high-heat-dissipation insulating member 64.

High-heat-dissipation insulating member 64 that is the second insulating member is higher in thermal conductivity than insulating members 61, 62, 63 that are the first insulating member. Specifically, when the aforementioned resin material is used for insulating members 61, 62, 63, for example, the thermal conductivity of the insulating members is generally 0.3 W/mK or less. High-heat-dissipation insulating member 64 has a higher thermal conductivity than this, and particularly it is preferable that high-heat-dissipation insulating member 64 has a thermal conductivity of 0.5 W/mK or more.

Preferably, high-heat-dissipation insulating member 64 is formed of a material having high electrical insulation property as well as fluidity that basically enables the material to be fed to fill the gap between primary winding 11 and sidewall 43 for example. Specifically, high-heat-dissipation insulating member 64 is preferably formed of a composition of a mixture of an insulating filler and an epoxy-based resin or silicone-based resin satisfying the aforementioned thermal conductivity, electrical insulation, and fluidity.

Actually, in a cross section as shown in FIG. 6 (A) and FIG. 6 (B) for example, turns of primary winding 11 and secondary winding 12 are visually recognizable as being spaced from each other, depending on the number of turns of each winding. FIG. 2, however, does not exactly show such an arrangement for the sake of simplicity, but shows primary and secondary windings as being disposed continuously in the direction in which the winding extends.

Figure 7:
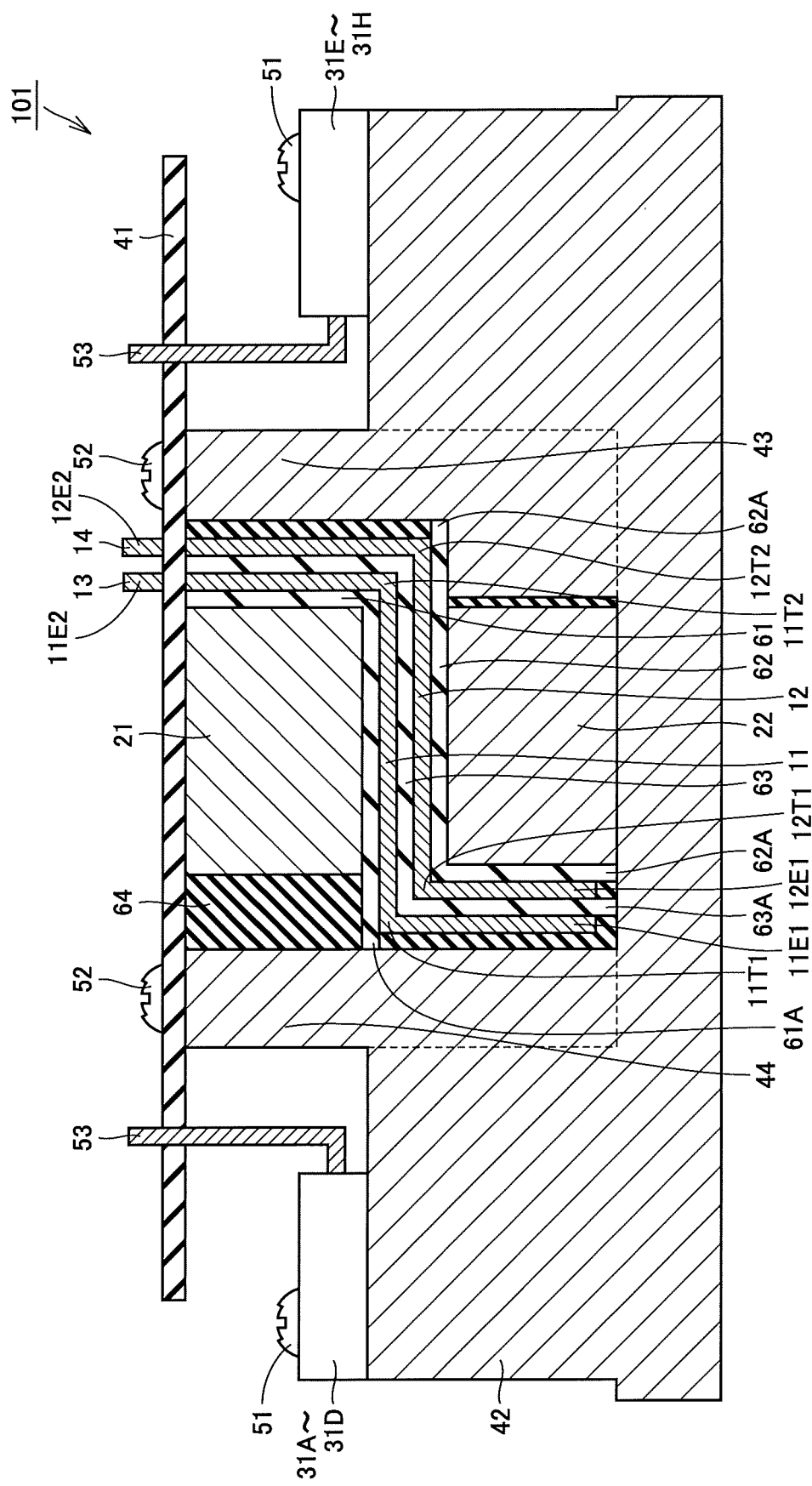
FIG. 7 is a schematic cross-sectional view showing a configuration of a modification different from the configuration of the power converter in FIG. 2 according to the first embodiment.

In view of the fact that upper magnetic core 21 that is an I-type core is smaller in dimension in the top-bottom direction (smaller in thickness) than lower magnetic core 22 that is an E-type core, FIG. 2 shows lower magnetic core 22 extending into the region located higher than primary and secondary windings 11, 12 extending in the right-left direction in FIG. 2, by way of example, not by way of limitation. For example, referring to FIG. 7, in a power converter 101 as a second example in the present embodiment, upper magnetic core 21 may be disposed in the whole region located higher than primary and secondary windings 11, 12 extending in the right-left direction in FIG. 2, and lower magnetic core 22 may be disposed in the whole region located lower than primary and secondary windings 11, 12 extending in the right-left direction. In FIG. 7, windings 11, 12 and insulating members 61, 62, 63 are wound around the uppermost region of center leg 22C of lower magnetic core 22. Power converter 101 in FIG. 7, however, is basically similar to power converter 100 as a first example in the present embodiment in FIG. 2, except for the above respects. Therefore, the same elements are denoted by the same reference numerals, and the description thereof will not be repeated.

Figure 8:
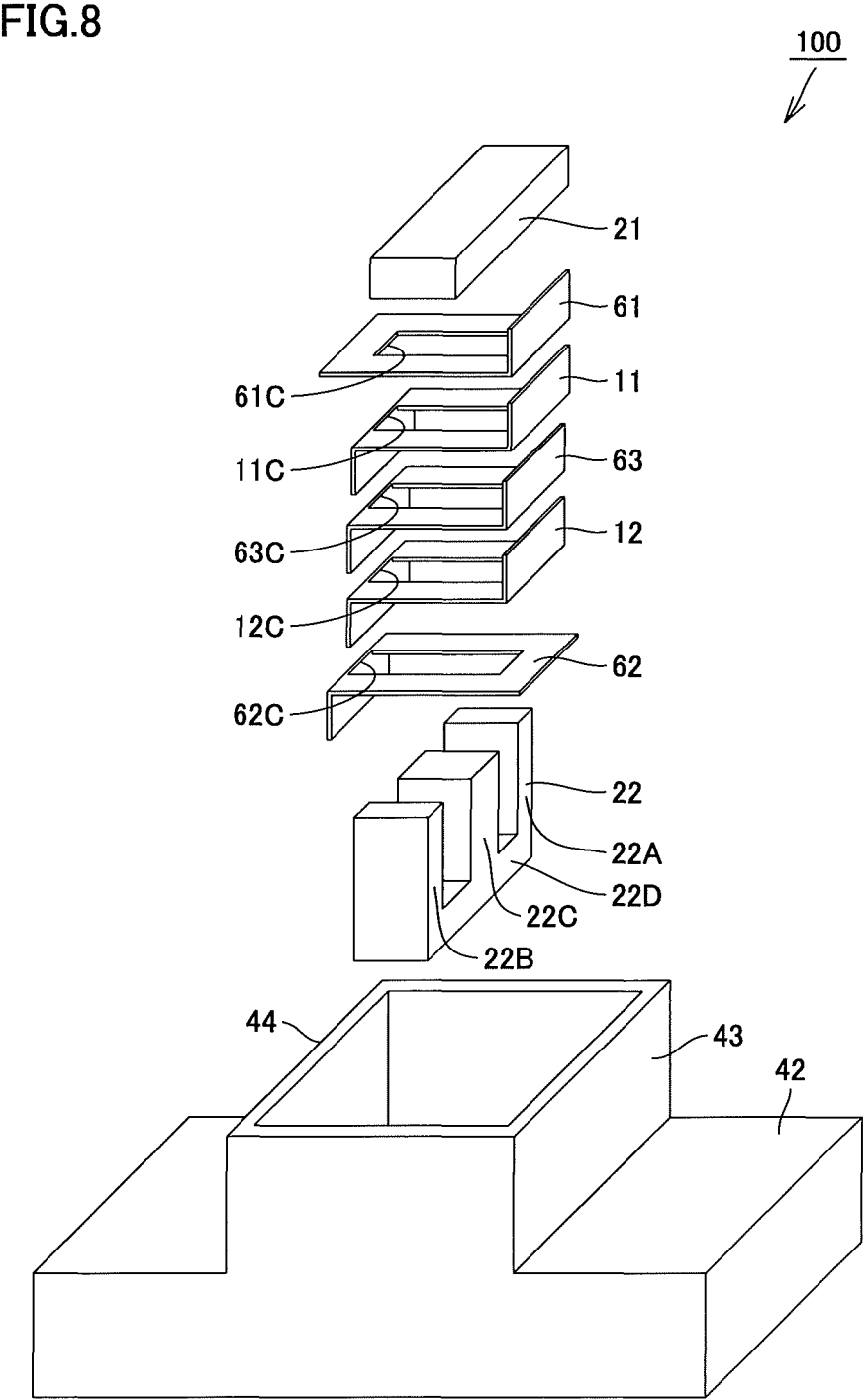
FIG. 8 is an exploded perspective view showing a configuration of the power converter according to the first embodiment shown in FIG. 2.

Using the exploded perspective view of FIG. 8, a general description is given of a method for assembling power converter 100 shown in FIG. 2. Referring to FIG. 8, a pair of sidewalls 43, 44 facing each other is mounted on casing 42 (on a region of casing 42 except for sidewalls 43, 44). These sidewalls 43, 44 and a pair of other walls facing each other and extending in the direction orthogonal to sidewalls 43, 44 as seen in plan view form a region surrounding, on the four sides, cores 21, 22 for example described later herein. The region surrounding them on the four sides and casing 42 (the region of casing 42 except for the sidewalls) form a single body.

Lower magnetic core 22 for example is then placed in a region with its four sides surrounded by the walls including sidewalls 43, 44. Lower magnetic core 22 is preferably mounted in such a manner that core coupling portion 22D is a bottommost part and outer legs 22A, 22B and center leg 22C protrude upward from core coupling portion 22D.

Insulating member 62, secondary winding 12, insulating member 63, primary winding 11, and insulating member 61 that are bent in advance at desired first and second bent portions (dashed-dotted line F1 and dotted line F2 for example) into so-called S shape as described above are then stacked in this order in such a manner that they are wound around center leg 22C. In insulating member 62, secondary winding 12, insulating member 63, primary winding 11, and insulating member 61, respective openings 62C, 12C, 63C, 11C, 61C like through holes are formed for allowing center leg 22C to pass through the openings. Center leg 22C extends through these openings 62C, 12C, 63C, 11C, 61C.

Upper magnetic core 21 in a rectangular flat-sheet shape is then mounted from above insulating member 61 so that upper magnetic core 21 extends over and is superposed on outer legs 22A, 22B and center leg 22C of lower magnetic core 22. After this, high-heat-dissipation insulating member 64 (not shown) that is a material satisfying the aforementioned high thermal conductivity, electrical insulation, and flowability is fed into the region surrounded, on four sides, by the walls including sidewalls 43, 44. In this way, the gaps in the region surrounded on the four sides are filled with high-heat-dissipation insulating member 64 as shown in FIG. 2.

Printed circuit board 41 which is not shown in FIG. 8 but shown for example in FIG. 2 is then secured with screws 52 to sidewalls 43, 44. Primary winding 11 is drawn upward through printed circuit board 41 to form extension 13, and secondary winding 12 is drawn upward through printed circuit board 41 to form extension 14. Extensions 13, 14 are secured to printed circuit board 41 by generally known soldering or the like. Further, as shown in FIG. 2, interconnection 53 extending from switching elements 31A to 31D for example is passed through printed circuit board 41 and soldered, for example to be secured to printed circuit board 41.

In FIG. 8, insulating members 61, 62, 63 are prepared as members separate from each other. Primary winding 11 and secondary winding 12 bent into S shape, for example, may be formed by means of insert molding from a resin material such as polyphenylene sulfide with high electrical insulation, and accordingly, insulating members 61, 62, 63 forming a single body may be fed and superposed on primary winding 11 and secondary winding 12 as shown in FIG. 2. In this case, superposed insulating members 61, 62, 63 and windings 11, 12 are placed in the region surrounded by casing 42 and sidewalls 43, 44 and gaps are filled with high-heat-dissipation insulating member 64.

In FIG. 8, the respective portions of insulating member 61 and primary winding 11 for example that extend in the top-bottom direction in FIG. 8 from the bent portions have their top-bottom dimensions shown to be considerably shorter as compared with FIG. 2. This is for the reason that the top-bottom dimensions are adjusted in order to illustrate, in the drawing, the many members such as insulating members 63, 62 and secondary winding 12 in the form of overlapping each other in the top-bottom direction. The respective portions of windings 11, 12 for example extending in the top-bottom direction in FIG. 8 correspond to the respective portions of windings 11, 12 extending in the top-bottom direction in FIG. 2, although their top-bottom dimensions in FIG. 8 are shown to be shorter than those in FIG. 2. Actually, therefore, as shown in FIG. 2, the top-bottom dimension of the upwardly extending portion of primary winding 11 for example is long enough to extend through printed circuit board 41. The top-bottom dimensions of other members are also actually longer then those shown in FIG. 8.

Functions and advantages of the power converter in the present embodiment are now described.

As described above, in power converters 101, 102 including magnetic cores 21, 22 in the present embodiment, a plurality of windings that are specifically primary winding 11 and secondary winding 12 are bent in S shape. Each first portion extending from the first bent portion and each second portion extending from the second bent portion are arranged to extend in the direction in which magnetic cores 21, 22 extend, which enables downsizing of transformer 10.

In the present embodiment, insulating members 61, 62, 63 that are the first insulating member are arranged to be sandwiched between primary winding 11 and secondary winding 12 and between windings 11, 12 and magnetic cores 21, 22. Accordingly, the electrically insulating state between primary winding 11 and secondary winding 12 and the electrically insulating state between windings 11, 12 and magnetic cores 21, 22 can be ensured.

In the present embodiment, high-heat-dissipation insulating member 64 that is the second insulating member is arranged to be sandwiched between sidewalls 43, 44 forming a part of casing 42 and windings 11, 12. Accordingly, heat generated from windings 11, 12 can be dissipated highly efficiently from high-heat-dissipation insulating member 64 to sidewalls 43, 44. Sidewalls 43, 44 forming a single body together with casing 42 serve as heat dissipaters like casing 42. High-heat-dissipation insulating member 64 having a thermal conductivity of 0.5 W/mK or more can ensure enhancement of heat dissipation from high-heat-dissipation insulating member 64 to sidewalls 43, 44. High-heat-dissipation insulating member 64 is disposed on only the outside of windings 11, 12, and windings 11, 12 is disposed so that at least respective portions (the first and second portions of primary and secondary windings 11, 12 disposed outward of secondary and primary windings 12, 11, respectively) are in contact with high-heat-dissipation insulating member 64. Thus, each of windings 11, 12 has its region located outward of the other winding and the outside of the region is the high-heat-dissipation member. Heat generated from windings 11, 12 can thus be dissipated highly efficiently from high-heat-dissipation insulating member 64 to sidewalls 43, 44.

In the present embodiment, high-heat-dissipation insulating member 64 is particularly disposed on only the outside of first and second portions of windings 11, 12, for example. Specifically, high-heat-dissipation insulating member 64 is disposed on only the outside of the first portions of windings 11, 12 with respect to cores 21, 22, while no high-heat-dissipation insulating member 64 is disposed on the inside (core 21/22-side) of the first portions of windings 11, 12, for example. Likewise, high-heat-dissipation insulating member 64 is disposed on only the outside of the second portions of windings 11, 12. Accordingly, the manufacture cost for the material for high-heat-dissipation insulating member 64 can be reduced, as compared with the case where high-heat-dissipation insulating member 64 is also disposed on the inside of the first and second portions.

Particularly lower magnetic core 22 has one (lower) end in the direction in which lower magnetic core 22 extends and this end is disposed in contact with casing 42 serving as a heat dissipater. A part of lower magnetic core 22 is thus in direct contact with casing 42, which increases the efficiency of dissipating heat from lower magnetic core 22 to casing 42. Upper magnetic core 21 and lower magnetic core 22 are partially connected to sidewalls 43, 44 with high-heat-dissipation insulating member 64 in between. A part of heat generated from magnetic cores 21, 22 can thus be dissipated speedily to sidewalls 43, 44 through high-heat-dissipation insulating member 64.

In the present embodiment, sidewalls 43, 44 form a single body together with casing 42, which facilitates heat conduction from sidewalls 43, 44 to casing 42 and accordingly enables further enhancement of heat dissipation from windings 11, 12.

As seen from the foregoing, power converters 100, 101 in the present embodiment enable all of downsizing of transformer 10, electrical insulation between windings 11, 12, and high dissipation of heat generated from windings 11, 12 and magnetic cores 21, 22.

Next, the electrical insulation property for each component of transformer 10 in the present embodiment is described. Lower magnetic core 22 having its lower end contacting casing 42 has the same potential as casing 42. Between lower magnetic core 22 and S-shaped secondary winding 12, insulating member 62 bent in L shape is sandwiched in FIG. 2. Lower magnetic core 22 is thus electrically insulated from secondary winding 12. Between secondary winding 12 and primary winding 11 both having S shape, S-shaped insulating member 63 is sandwiched. Secondary winding 12 is thus electrically insulated from primary winding 11. Between the portion of lower magnetic core 22 or upper magnetic core 21 located directly above windings 11, 12 extending in the right-left direction in FIG. 2 and primary winding 11 in S shape, insulating member 61 bent in L shape is sandwiched in FIG. 2. Accordingly, primary winding 11 is electrically insulated from magnetic cores 21, 22 directly above primary winding 11. Respective materials and thicknesses of insulating members 61, 62, 63 can be controlled to satisfy electrical insulation performance required between primary winding 11, secondary winding 12, upper magnetic core 21, and lower magnetic core 22. The electrical insulation performance is defined as a withstand voltage of 2000 V that can be applied for one minute against electrical insulation between primary winding 11 and secondary winding 12 for example. When insulating members 61, 62, 63 are made of a resin material having a withstand voltage of 10 kV/mm or more, for example, the thickness of the insulating members (particularly insulating member 63 between primary winding 11 and secondary winding 12) can be 0.2 mm or more to achieve a desired withstand voltage.

Referring again to FIG. 2, a leftmost end 61A of insulating member 61 extending in the right-left direction in FIG. 2 is formed to extend leftward in FIG. 2 further than the first portion of primary winding 11. A rightmost end 62A of insulating member 62 extending in the right-left direction in FIG. 2 is formed to extend rightward in FIG. 2 further than the second portion of secondary winding 12. A bottommost end 62A of insulating member 62 extending in the top-bottom direction in FIG. 2 is formed to extend downward in FIG. 2 further than the bottommost part of the first portion of secondary winding 12. A bottommost end 63A of insulating member 63 extending in the top-bottom direction in FIG. 2 is formed to extend downward in FIG. 2 further than the bottommost part of the first portion of secondary winding 12.

Since ends 61A, 62A, 63A thus protrude relative to windings 11, 12, gaps are formed between ends 61A, 62A, 63A and adjacent windings 11, 12. The gaps are filled with a high-fluidity material forming high-heat-dissipation insulating member 64 after members such as windings 11, 12 forming transformer 10 are placed in the region surrounded by sidewalls 43, 44. High-heat-dissipation insulating member 64 has heat dissipation property as well as electrical insulation property. Therefore, the region of high-heat-dissipation insulating member 64 sandwiched between primary winding 11 and sidewall 44 for example can ensure high heat dissipation property as well as high electrical insulation property. The thickness of high-heat-dissipation insulating member 64 fed in the gaps is substantially equal to the dimension of the portion of each end 61A, 62A, 63A extending in the direction in which insulating member 61, 62, 63 extends in FIG. 2. The length of ends 61A, 62A, 63A in the direction in which the ends extend can be controlled to thereby control the thickness of high-heat-dissipation insulating member 64 and control electrical insulation property provided by high-heat-dissipation insulating member 64.

Next, the heat dissipation property for each component of transformer 10 in the present embodiment is described. Lower magnetic core 22 has a path through which heat is directly dissipated to casing 42 from the lower surface of core 22 that contacts casing 42, and a path through which heat is dissipated to sidewall 43 through high-heat-dissipation insulating member 64. Upper magnetic core 21 has a path through which heat is dissipated to sidewall 44 through high-heat-dissipation insulating member 64. The amount of heat generated from upper magnetic core 21 and lower magnetic core 22 that form a magnetic component is proportional to the volume of cores 21, 22. Then, upper magnetic core 21 having only one heat dissipation path is formed as I-type core and lower magnetic core 22 having two heat dissipation paths is formed as E-type core. Accordingly, the volume of lower magnetic core 22 having two heat dissipation paths can be made larger than the volume of upper magnetic core 21 having only one heat dissipation path.

Heat of primary winding 11 is dissipated from its first portion in the lower left part in FIG. 2 to sidewall 44 through high-heat-dissipation insulating member 64. Heat of secondary winding 12 is dissipated from its second portion in the upper right part in FIG. 2 to sidewall 43 through high-heat-dissipation insulating member 64. Sidewall 43 is relatively long in the dimension in the top-bottom direction in FIG. 2. Therefore, in order to predominantly increase the efficiency of dissipating heat from the second portion of secondary winding 12 through sidewall 43, for example, sidewall 43 may be formed to have a greater width in the right-left direction in FIG. 2 in its lower portion (region lower than windings 11, 12 extending in the right-left direction in FIG. 2), relative to its upper portion. In contrast, sidewall 44 in FIG. 2 is not formed in such a manner. In this way, the efficiency of dissipating heat from the second portion of secondary winding 12 through sidewall 43 to the lower portion of casing 42 can be further increased.

Insulating members 61, 62, 63 that are the first insulating member are lower in heat dissipation property (thermal conductivity) than high-heat-dissipation insulating member 64. Insulating members 61, 62, 63 are not required to have high heat dissipation property like that of high-heat-dissipation insulating member 64. The degree of freedom in selecting the material for insulating members 61, 62, 63 can therefore be increased. Insulating members 61, 62, 63 can thus be formed of a material of a lower cost than the material for high-heat-dissipation insulating member 64, and the overall cost of power converters 100, 101 can be reduced. As the degree of freedom in selecting the material for insulating members 61, 62, 63 is increased, it is not necessarily required to increase adhesion between windings 11, 12 and magnetic cores 21, 22 and insulating members 61, 62, 63, for example, which eliminates the need to use an adhesive for bonding them.

Second Embodiment

Figure 9:
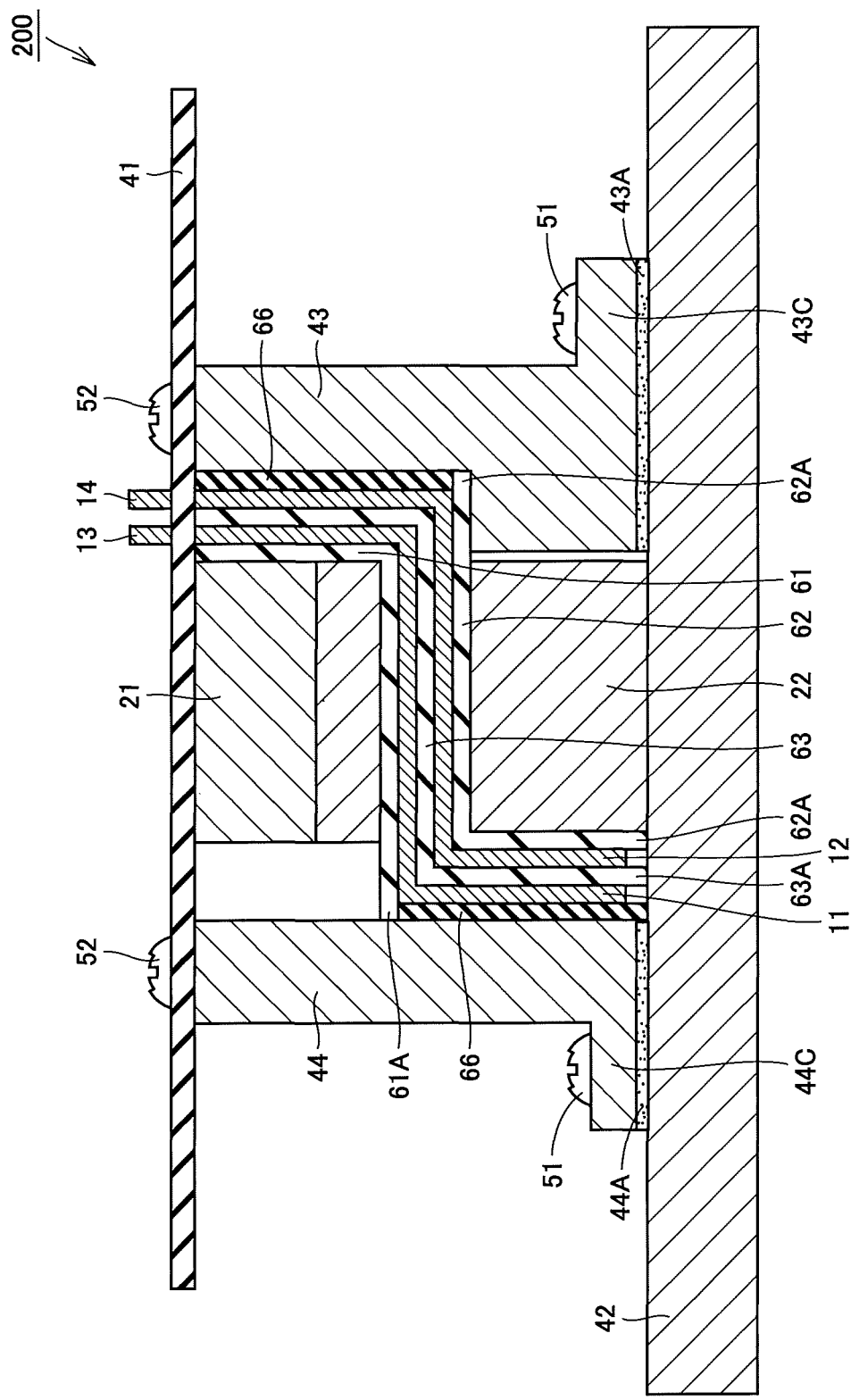
FIG. 9 is a schematic cross-sectional view showing an example of a configuration of a power converter according to a second embodiment.
Figure 10:
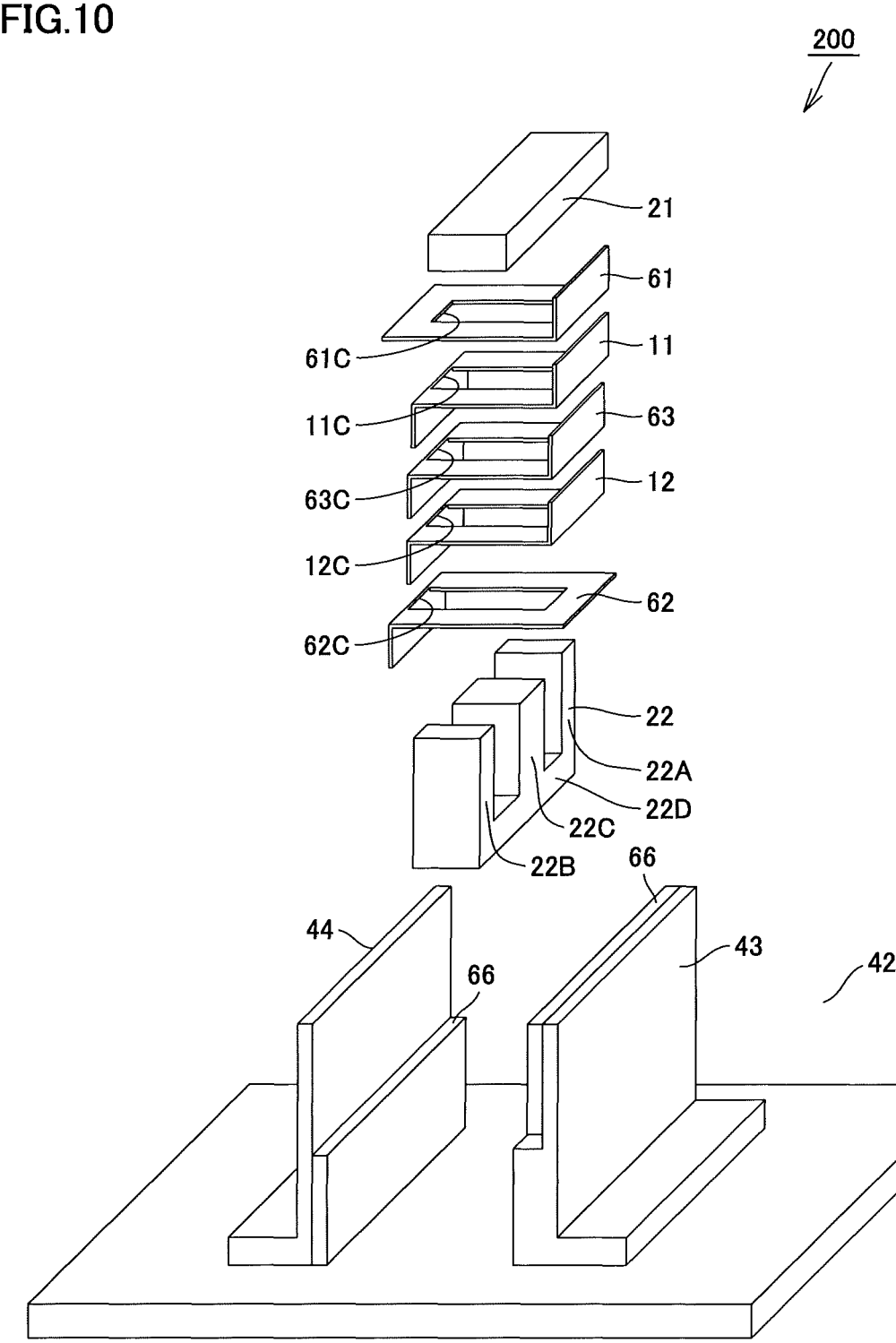
FIG. 10 is an exploded perspective view showing the configuration of the power converter according to the second embodiment shown in FIG. 9.

Using FIGS. 9 and 10, a description is given of a specific configuration of a power converter in the present embodiment.

Referring to FIG. 9, a power converter 200 in the present embodiment basically has a configuration similar to power converter 100 in the first embodiment. In power converter 200, however, casing 42 and sidewalls 43, 44 do not form a single body but are separate from each other. Specifically, casing 42 serving as a heat dissipater is disposed in only the region located lower in FIG. 9 than lower magnetic core 22. Sidewalls 43, 44 extending in the top-bottom direction in FIG. 9 are disposed so that respective ends (lower ends) in this direction are in contact with casing 42. Sidewalls 43, 44 on casing 42 are secured onto the topmost surface of casing 42 with screws 51.

Like the first embodiment, sidewall 43 is particularly larger in width in the right-left direction in FIG. 9 in its region located lower in FIG. 9 than its region located in contact with high-heat-dissipation insulating member 64, relative to the width of the other region. In FIG. 9, sidewall 44 is also larger in width in its lower region, like sidewall 43.

Specifically, in the present embodiment, casing 42 serving as a heat dissipater is disposed in contact with respective (lower) end faces of lower magnetic core 22 and a plurality of sidewalls 43, 44 in the top-bottom direction in which core 22 and sidewalls 43, 44 extend in FIG. 9. A plurality of sidewalls 43, 44 include joint portions 43C, 44C. Joint portions 43C, 44C are included in bottommost portions located in contact with casing 42. Joint portions 43C, 44C protrude in the direction (right-left direction in FIG. 9)

traversing the direction (top-bottom direction) in which sidewalls 43, 44 extend, relative to the regions other than the bottommost portions.

In the present embodiment, an insulating member sheet 66 that is a second insulating member is disposed in the region between sidewall 44 and the first portion of primary winding 11 (outside secondary winding 12). In the first embodiment, high-heat-dissipation insulating member 64 is disposed in this region. Likewise, in the present embodiment, insulating member sheet 66 that is the second insulating member is also disposed in the region between sidewall 43 and the second portion of secondary winding 12 (outside primary winding 11). In the first embodiment, high-heat-dissipation insulating member 64 is disposed in this region. In other words, in the present embodiment, insulating member sheet 66 is disposed outside a plurality of windings 11, 12 so that insulating member sheet 66 is in contact with each of a plurality of sidewalls 43, 44 and each of a plurality of windings 11, 12.

Insulating member sheet 66 is a sheet-type member that is soft and higher in thermal conductivity than insulating members 61, 62, 63 that are the first insulating member.

In the first embodiment, high-heat-dissipation insulating member 64 is disposed in the region located higher than windings 11, 12 extending in the right-left direction in FIG. 9 and located between sidewall 44 and upper magnetic core 21 and a part of lower magnetic core 22. Likewise, in the first embodiment, high-heat-dissipation insulating member 64 is also disposed in the region located lower than windings 11, 12 extending in the right-left direction in FIG. 9 and located between sidewall 43 and a part of lower magnetic core 22. In the present embodiment, however, none of high-heat-dissipation insulating member 64 and insulating member sheet 66 that are the second insulating member is disposed in these regions, and gaps are formed instead.

Power converter 200 in the present embodiment differs from power converter 100 in the first embodiment in the above-described respects. In other respects, power converter 200 is substantially identical in configuration to the first embodiment. Therefore, the same elements are denoted by the same reference characters, and the description thereof will not be repeated.

Using the exploded perspective view of FIG. 10, a general description is given of a method for assembling power converter 200 shown in FIG. 9. Referring to FIG. 10, lower magnetic core 22 is first mounted on a part of the topmost surface of casing 42, in such a manner that core coupling portion 22D is the bottommost portion and outer legs 22A, 22B and center leg 22C protrude upward from core coupling portion 22D.

Next, like the first embodiment, insulating member 62, secondary winding 12, insulating member 63, primary winding 11, and insulating member 61 are stacked in this order in such a manner that they are wound around center leg 22C and these insulating members and windings are each bent in advance at desired first and second bent portions (for example, dashed-dotted line F1 and dotted line F2) to form a so-called S shape. Like the first embodiment, center leg 22C extends through each of openings 62C, 12C, 63C, 11C, 61C. After this, upper magnetic core 21 in a rectangular flat-sheet shape is mounted from above insulating member 61 in such a manner that upper magnetic core 21 extends over outer legs 22A, 22B and center leg 22C of lower magnetic core 22 and overlaps them.

Next, as shown in FIG. 10, sidewalls 44, 43 are secured onto a part of the topmost surface of casing 42 with screws 51 (see FIG. 9). On each of sidewalls 44, 43, insulating member sheet 66 is attached to a partial region (lower region of sidewall 44, upper region of sidewall 43) of one surface (inner surface in the finally set state). At this time, sidewalls 43, 44 are secured to casing 42 in such a manner that insulating member sheet 66 is pressed against and in contact with respective top surfaces of the first portion of primary winding 11 and the second portion of secondary winding 12 that are mounted beforehand.

The material forming insulating member sheet 66 is a sheet-shaped member that is soft and higher in thermal conductivity (than insulating members 61, 62, 63), and the material is selected based on the thermal conductivity and the withstand voltage. For example, insulating member sheet 66 is formed from a low-hardness heat-dissipation silicone rubber having a thermal conductivity of 1.8 W/mK or more and a withstand voltage of 22 kV/mm or more, for example. Alternatively, insulating member sheet 66 may be formed by a heat-dissipation spacer having a thermal conductivity of 1 W/mK or more and a withstand voltage of 10 kV/mm or more.

Referring to FIG. 10, the first portion (lower left portion) of primary winding 11 and the second portion (upper right portion) of secondary winding 12 are originally (at the time they are set on casing 42) arranged to extend in the direction (top-bottom direction in FIG. 10) substantially perpendicular to the main surface of casing 42. However, another method may be used. Specifically, before sidewalls 43, 44 are pressed against windings 11, 12, for example, the first portion (lower left portion) of primary winding 11 and the second portion (upper right portion) of secondary winding 12 may extend obliquely to the main surface of casing 42 (so that they are inclined toward sidewalls 43, 44) and thereafter sidewalls 43, 44 may be pressed against windings 11, 12 to cause windings 11, 12 to extend in the perpendicular direction. In this way, the contact pressure applied from sidewalls 43, 44 to press insulating member sheet 66 against windings 11, 12 can be increased. Accordingly, the contact thermal resistance of the surface of insulating member sheet 66 contacting sidewalls 43, 44 and the surface of insulating member sheet 66 contacting primary winding 11 and secondary winding 12 can be reduced.

Functions and advantages of the power converter in the present embodiment are now described.

As described above, in the present embodiment, heat is transferred from windings 11, 12 to sidewalls 43, 44 through high-heat-dissipation insulating member sheet 66 instead of high-heat-dissipation insulating member 64 in the first embodiment. Therefore, like the first embodiment, the effect of speedily dissipating heat from windings 11, 12 through sidewalls 43, 44 is ensured.

In the present embodiment like the first embodiment, windings 11, 12 are bent and insulating member 63 is disposed between windings 11 and 12. Accordingly, the present embodiment also enables all of downsizing of the transformer, electrical insulation, and heat dissipation.

In the present embodiment, sidewalls 43, 44 are separate members from casing 42. The bottommost portions of sidewalls 43, 44 include joint portions 43C, 44C protruding in the right-left direction in FIG. 9 relative to other regions. Accordingly, the area of the joint between sidewalls 43, 44 and casing 42 can be increased, and therefore, heat can be efficiently transferred from sidewalls 43, 44 to casing 42.

In the present embodiment, the second insulating member is not disposed between upper magnetic core 21/lower magnetic core 22 and sidewalls 43, 44, and gaps are formed instead. In the present embodiment, particularly in order to enable heat to be dissipated predominantly from windings 11, 12, both windings 11, 12 are in contact with sidewalls 43, 44 through insulating member sheet 66. In this way, the amount of the second insulating member having high heat dissipation property can be reduced, and accordingly the manufacture cost can be reduced, as compared with the first example.

Next, the electrical insulation property for each component of transformer 10 in the present embodiment is described.

Referring to FIG. 9, in the present embodiment as well, leftmost end 61A of insulating member 61 extending in the right-left direction in FIG. 9 is formed to extend leftward in FIG. 9 further than the first portion of primary winding 11. Rightmost end 62A of insulating member 62 extending in the right-left direction in FIG. 9 is formed to extend rightward in FIG. 9 further than the second portion of secondary winding 12. Bottommost end 62A of insulating member 62 extending in the top-bottom direction in FIG. 9 is formed to extend downward in FIG. 9 further than the first portion of secondary winding 12. Bottommost end 63A of insulating member 63 extending in the top-bottom direction in FIG. 9 is formed to extend downward in FIG. 9 further than the first portion of secondary winding 12. Gaps are formed between these ends 61A, 62A, 63A and adjacent windings 11, 12. The gaps are filled with high-heat-dissipation insulating member 64 in the first embodiment. In the present embodiment, nothing is fed to the gaps and the size of the gaps satisfies the electrical insulation performance.

Insulating member sheet 66 is sandwiched between the first portion (lower left portion) of primary winding 11 and sidewall 44 and between the second portion (upper right portion) of secondary winding 12 and sidewall 43. Insulating member sheet 66 is in contact with both primary winding 11 and sidewall 44 to electrically insulate primary winding 11 from sidewall 44. Insulating member sheet 66 is also in contact with both secondary winding 12 and sidewall 43 to electrically insulate secondary winding 12 from sidewall 43.

As described above, leftmost end 61A of insulating member 61 extending in the right-left direction in the drawing is formed to extend leftward in FIG. 9 further than the first portion of primary winding 11. Sidewall 44 on which insulating member sheet 66 is formed can be pressed against the first portion of primary winding 11 so that sidewall 44 is in contact with end 61A of insulating member 61. The thickness of insulating member sheet 66 corresponding to the length of end 61A can thus be ensured.

Rightmost end 62A of insulating member 62 extending in the right-left direction in the drawing is formed to extend rightward in FIG. 9 further than the second portion of secondary winding 12. Sidewall 43 on which insulating member sheet 66 is formed can be pressed against the second portion of secondary winding 12 so that sidewall 43 is in contact with end 62A of insulating member 62. The thickness of insulating member sheet 66 corresponding to the length of end 62A can thus be ensured.

Next, the heat dissipation property for each component of transformer 10 in the present embodiment is described. In the first embodiment, the gaps between casing 42/sidewalls 43, 44 and components of transformer 10 are filled by high-heat-dissipation insulating members 64. In the first embodiment, therefore, paths are provided through which heat from lower magnetic core 22 and upper magnetic core 21 is dissipated to sidewalls 43, 44 through high-heat-dissipation insulating member 64.

In contrast, in the present embodiment, the region between lower magnetic core 22 and sidewall 43 and the region between upper or lower magnetic core 21/22 and sidewall 44 are not filled by high-heat-dissipation insulating member 64 or the like, and gaps are formed in these regions instead. The present embodiment is therefore inferior to the first embodiment in the heat dissipation from magnetic cores 21, 22.

However, if the amount of change of the magnetic flux density of upper magnetic core 21 and lower magnetic core 22 is small or the frequency at which the magnetic flux density changes is low, the loss of upper magnetic core 21 and lower magnetic core 22 is small. The configuration having gaps as shown in FIG. 9 can therefore be used.

As shown in FIG. 9, in the present embodiment, sidewalls 43, 44 are members separate from casing 42, and the sidewalls and the casing are joined to each other by heat-dissipation greases 43A, 44A. Preferably, heat-dissipation greases 43A, 44A are applied to the portion where casing 42 is to be joined with respective bottommost parts of joint portions 43C, 44C in which the width of sidewalls 43, 44 is larger, for example. Since heat-dissipation greases 43A, 44A are thus supplied, the contact thermal resistance at the boundaries between joint portions 43C, 44C and casing 42 can be reduced and deterioration of the heat dissipation property can be suppressed.

Instead of cooling casing 42 under sidewalls 43, 44 by means of air cooling or water cooling, air may be blown onto the surfaces of sidewalls 43, 44 opposite to the surfaces thereof on which windings 11, 12 are disposed, to thereby directly cool sidewalls 43, 44 (air cooling).

Third Embodiment

Referring to FIGS. 11 to 14, a specific configuration of a power converter in the present embodiment is described.

Figure 11:
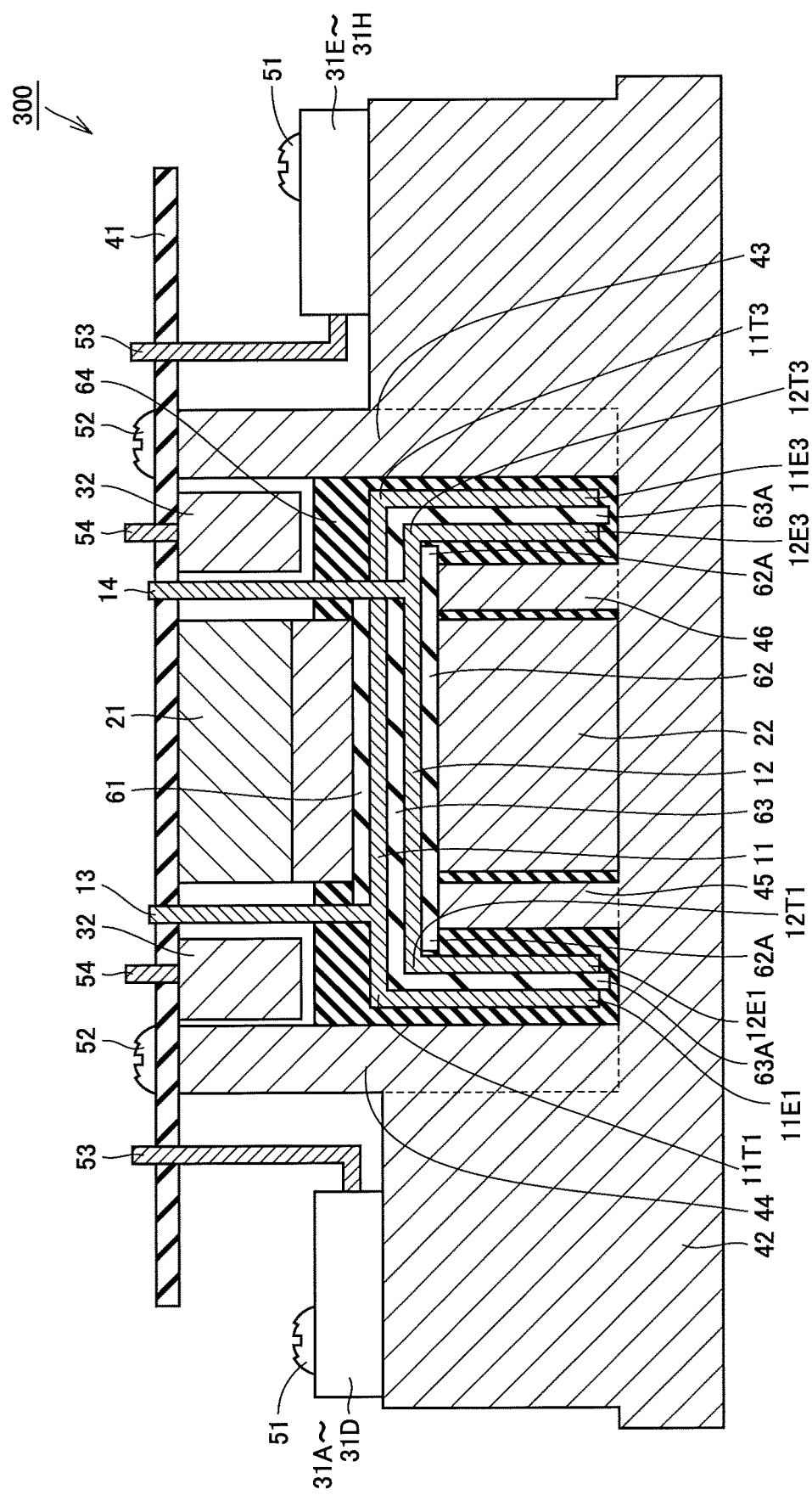
FIG. 11 is a schematic cross-sectional view showing an example of a configuration of a power converter according to a third embodiment.

Referring to FIG. 11, a power converter 300 in the present embodiment basically has a configuration similar to power converter 100 in the first embodiment. Specifically, in power converter 300 similar to power converter 100, primary winding 11 and secondary winding 12 are each bent to have portions extending in the top-bottom-direction in FIG. 11 in which upper magnetic core 21 and lower magnetic core 22 extend. Sidewalls 43, 44 forming a single body together with casing 42 are disposed rightward and leftward of magnetic cores 21, 22. Insulating members 61, 62, 63 that are the first insulating member are disposed between primary winding 11 and secondary winding 12 and between windings 11, 12 and magnetic cores 21, 22. High-heat-dissipation insulating member 64 that is the second insulating member is disposed between windings 11, 12 and sidewalls 43, 44 in such a manner that high-heat-dissipation insulating member 64 is in contact with each of windings 11, 12 and sidewalls 43, 44.

In power converter 300, however, the direction in which the two windings, namely primary winding 11 and secondary winding 12 are bent at the same positions as dashed-dotted line F1 (first bent portion) and dotted line F2 (second bent portion) in FIG. 3 for example is different from those in power converter 100. Each of primary winding 11 and secondary winding 12 has a first portion extending from its one end, specifically an end located leftward of magnetic cores 21, 22 in FIG. 11 to the first bent portion located leftward of magnetic cores 21, 22, and a second portion extending from its other end located rightward of magnetic cores 21, 22 in FIG. 11 to the second bent portion located rightward of magnetic cores 21, 22. Primary winding 11 and secondary winding 12 are each bent in such a manner that the direction in which the first portion extends from the first bent portion is the same as the direction in which the second portion extends from the second bent portion and this direction is the downward direction in FIG. 11. The first portion and the second portion extend in the direction in which magnetic cores 21, 22 extend, like the first embodiment.

In FIG. 11, the two windings, namely primary winding 11 and secondary winding 12 are each bent in so-called C shape. As primary winding 11 and secondary winding 12 are bent, insulating member 63 between primary and secondary windings 11, 12 is also bent at positions corresponding to the first and second bent portions.

In the cross section as shown in FIG. 11, primary winding 11 has a bottommost portion 11E1 and a bottommost portion 11E3 in the direction in which magnetic cores 21, 22 extend (top-bottom direction in FIG. 9), and bottommost portions 11E1 and 11E3 are herein defined as one end and the other end, respectively. In the cross section in FIG. 11, primary winding 11 has a bent portion relatively closer to bottommost portion 11E1 and a bent portion relatively closer to bottommost portion 11E3, and the former bent portion and the latter bent portion are defined as first bent portion 11T1 and second bent portion 11T3, respectively. The region between bottommost portion 11E1 and first bent portion 11T1 is the first portion, and the region between second bent portion 11T3 and the bottommost portion 11E3 is the second portion. Likewise, in the cross section as shown in FIG. 9, secondary winding 12 has a bottommost portion 12E1 and a bottommost portion 12E3 in the direction in which magnetic cores 21, 22 extend (top-bottom direction in FIG. 9), and bottommost portions 12E1 and 12E3 are defined as one end and the other end, respectively. In the cross section in FIG. 9, secondary winding 12 has a bent portion relatively closer to bottommost portion 12E1 and a bent portion relatively closer to bottommost portion 12E3, and the former bent portion and the latter bent portion are defined as first bent portion 12T1 and second bent portion 12T3, respectively. The region between bottommost portion 12E1 and first bent portion 12T1 is the first portion, and the region between second bent portion 12T2 and bottommost portion 12E3 is the second portion.

In FIG. 11, primary winding 11 is wound on the upper side (upper magnetic core 21 side) in FIG. 9 relative to secondary winding 12 by way of example. Consequently, lower magnetic core 22 is enclosed on the three sides by bent primary winding 11 and bent secondary winding 12, and secondary winding 12 is disposed inward of primary winding 11, as seen from lower magnetic core 22.

A sidewall 45 is disposed in the region between lower magnetic core 22 and the first portions (lower left portions) of windings 11, 12, and a sidewall 46 is disposed in the region between lower magnetic core 22 and the second portions (lower right portions) of windings 11, 12. Like sidewalls 43, 44, sidewalls 45, 46 form a part of casing 42 and thus form a single body together with casing 42. Thus, sidewall 44, sidewall 45, lower magnetic core 22, sidewall 46, and sidewall 43 are arranged in order from the left side toward the right side in FIG. 11.

High-heat-dissipation insulating member 64 is disposed outward (upward) of primary winding 11 as seen from magnetic cores 21, 22. Specifically, high-heat-dissipation insulating member 64 is disposed in such a manner that high-heat-dissipation insulating member 64 is in contact with both the first portion of primary winding 11 and sidewall 44 and in contact with the second portion of primary winding 11 and sidewall 43. High-heat-dissipation insulating member 64 is also disposed on a part of the region between the first and second portions of primary winding 11.

Further, high-heat-dissipation insulating member 64 is disposed in the region between the first portion of secondary winding 12 and sidewall 45 and the region between the second portion of secondary winding 12 and sidewall 46. High-heat-dissipation insulating member 64 is also disposed between lower magnetic core 22 and each of sidewalls 45, 46.

In other words, in the present embodiment, high-heat-dissipation insulating member 64 is formed not only in the region outside windings 11, 12 but also in the region inside windings 11, 12. In this respect, the present embodiment differs from the first embodiment in which high-heat-dissipation insulating member 64 is disposed on only the outside of each of primary winding 11, secondary winding 12, and magnetic cores 21, 22.

Insulating member 61 in the present embodiment is disposed to extend in the right-left direction in FIG. 11, in the region between primary winding 11 (one winding) and the magnetic cores (upper magnetic core 21 and lower magnetic core 22) directly above primary winding 11. Insulating member 61 is in contact with both primary winding 11 and the magnetic cores (upper magnetic core 21 and lower magnetic core 22). Insulating member 62 in the present embodiment is disposed to extend in the right-left direction in FIG. 11, in the region between secondary winding 12 (the other winding) and lower magnetic core 22 or sidewalls 45, 46 directly below secondary winding 12. Insulating member 62 is in contact with both secondary winding 12 and lower magnetic core 22. Further, insulating member 63 in the present embodiment is disposed in the region between respective first portions of primary and secondary windings 11, 12, the region between respective second portions of primary and secondary windings 11, 12, and the region extending in the right-left direction in FIG. 11, between the first and second portions. Insulating member 63 is in contact with both primary winding 11 and secondary winding 12.

Moreover, in the present embodiment like the first embodiment, primary winding 11 is drawn upward through printed circuit board 41 to form extension 13, and secondary winding 12 is also drawn upward through printed circuit board 41 to form extension 14. In the present embodiment, switching elements 31A to 31D and rectifying elements 31E to 31H are also secured to casing 42 with screws 51 and electrically connected by interconnection 53 to printed circuit board 41.

In the present embodiment, capacitor 32 may be disposed on the lower main surface of printed circuit board 41 in FIG. 11 and electrically connected by an interconnection 54 to printed circuit board 41, for example. In this way, the regions directly above the first and second portions of primary winding 11 and secondary winding 12 are used effectively, which enables downsizing of the entire power converter 300. In the first and second embodiments as well, the layout can be adapted to implement a similar configuration (not shown) to the above-described one.

Power converter 300 in the present embodiment differs from power converter 100 in the first embodiment in the above-described respects. In other respects, the present embodiment is substantially identical in configuration to the first embodiment. Therefore, the same elements are denoted by the same reference characters, and the description thereof will not be repeated.

Figure 12:
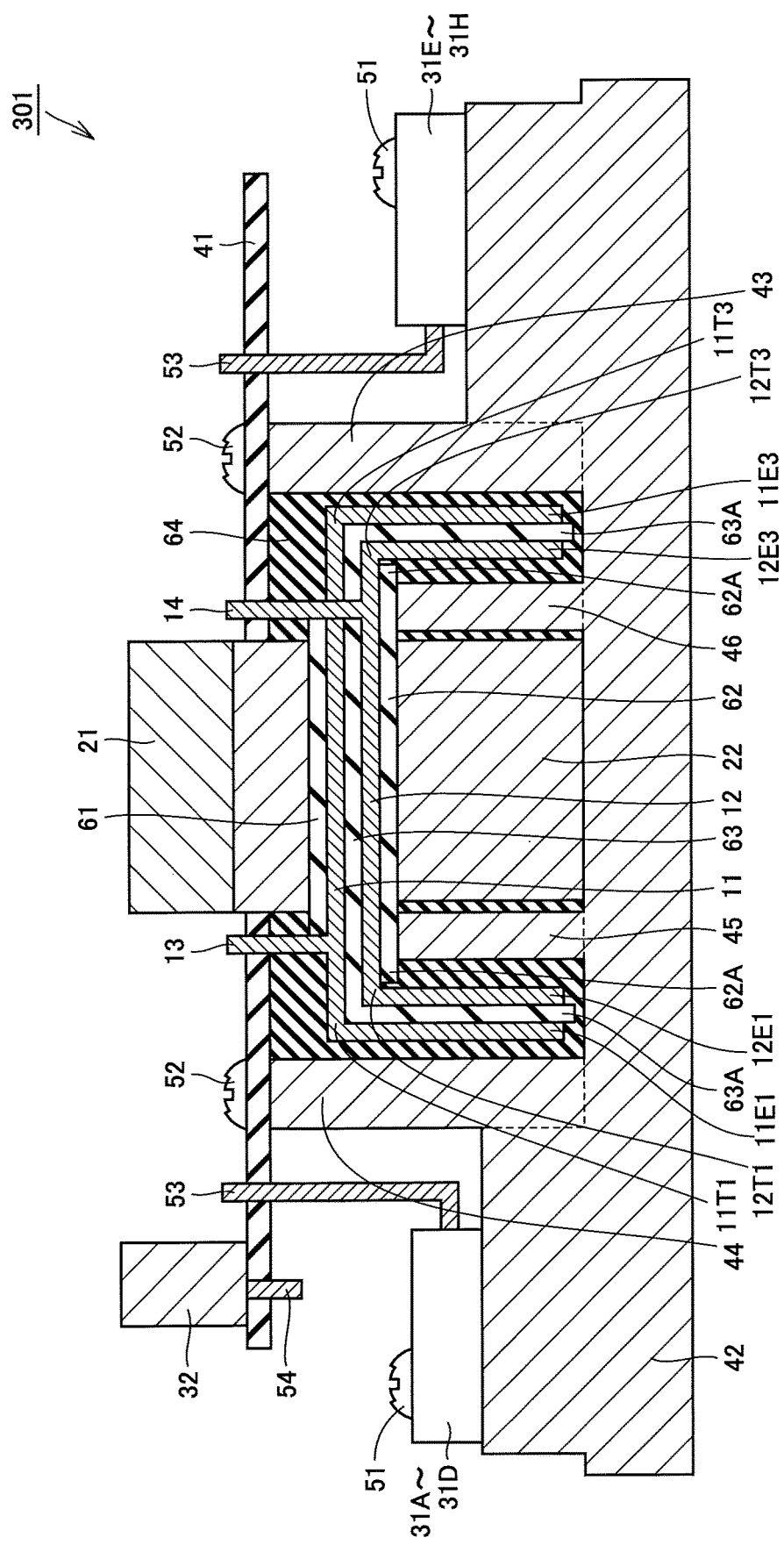
FIG. 12 is a schematic cross-sectional view showing a configuration of a modification different from the configuration of the power converter in FIG. 11, according to the third embodiment.

Referring to FIG. 12, in a power converter 301 as a second example in the present embodiment, printed circuit board 41 is partially opened in the region overlapping magnetic cores 21, 22 as seen in plan view. In this opening, upper magnetic core 21 extends through printed circuit board 41 to protrude from below to above printed circuit board 41. In power converter 301 in FIG. 12, transformer 10 is located higher than transformer 10 of power converter 300 in FIG. 11. Capacitor 32 is therefore disposed on the upper side, not the lower side, of printed circuit board 41, and connected by interconnection 54 to printed circuit board 41. In other respects, however, power converter 301 in FIG. 12 is similar to power converter 300 as the first example in the present embodiment in FIG. 11. Therefore, the same elements are denoted by the same reference numerals, and the description thereof will not be repeated.

The length of interconnection 53 drawn from switching elements 31A to 31D for example to be connected to printed circuit board 41 is restricted. In the arrangement as shown in FIG. 12, the positions of the elements under printed circuit board 41 are higher than those in FIG. 11 as a whole, which enables shortening of the top-bottom distance in FIG. 12 between switching elements 31A to 31D for example and printed circuit board 41. In FIG. 12, therefore, the length of interconnection 53 can be shorter than that in FIG. 11. Power converter 301 in FIG. 12 is entirely lower in profile, which enables reduction of the size of the entire power converter 301.

Figure 13:
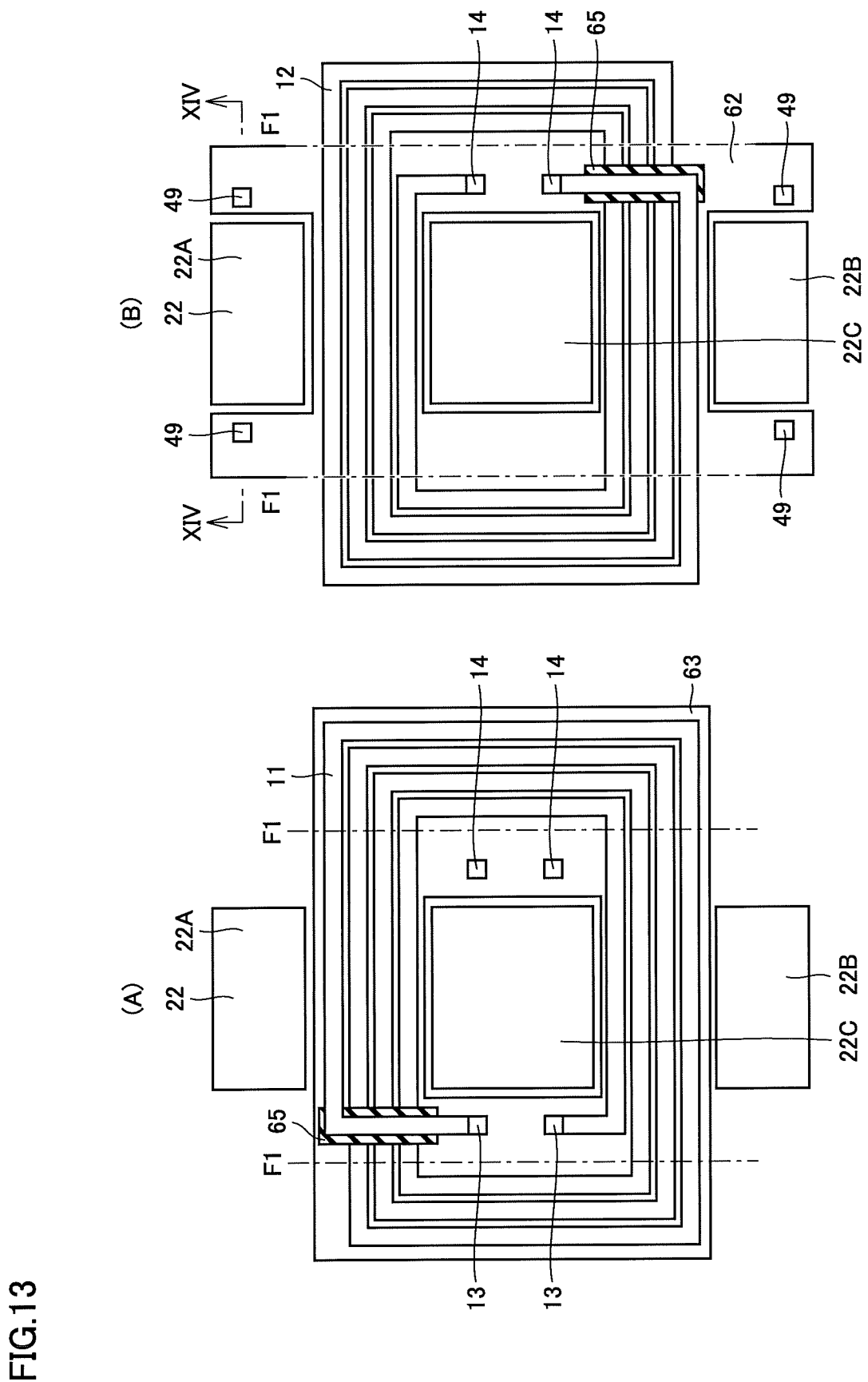
FIG. 13 shows a schematic plan view (A) of a primary winding as seen from above the primary winding, before the primary winding wound around a center leg of a lower magnetic core is bent, and a schematic plan view (B) of a secondary winding as seen from above the secondary winding, before the secondary winding wound around the center leg of the lower magnetic core is bent.

FIGS. 13 (A) and (B) show respective states of primary winding 11 and secondary winding 12 in the present embodiment before being bent along dashed-dotted line F1 and dotted line F2 in FIG. 13 (namely only having been wound around center leg 22C), like FIGS. 3 (A) and (B). FIGS. 13 (A) and (B) are slightly different from FIGS. 3 (A) and (B) in terms of the positions of extensions 13, 14 and insulating member 65, but basically similar to FIGS. 3 (A) and (B) in that four turns for example of each of primary winding 11 and secondary winding 12 are wound round center leg 22C of lower magnetic core 22.

In the present embodiment as described above, windings 11 and 12 are each bent so that the first and second portions extend in the same direction to form a C-shaped cross section. Therefore, in both (A) and (B) of FIG. 13, the winding is bent rearward with respect to the plane of FIG. 13, at the first bent portion (dashed-dotted line leftward of lower magnetic core 22) and the second bent portion (dashed-dotted line rightward of lower magnetic core 22) along dashed-dotted line F1.

Figure 14:
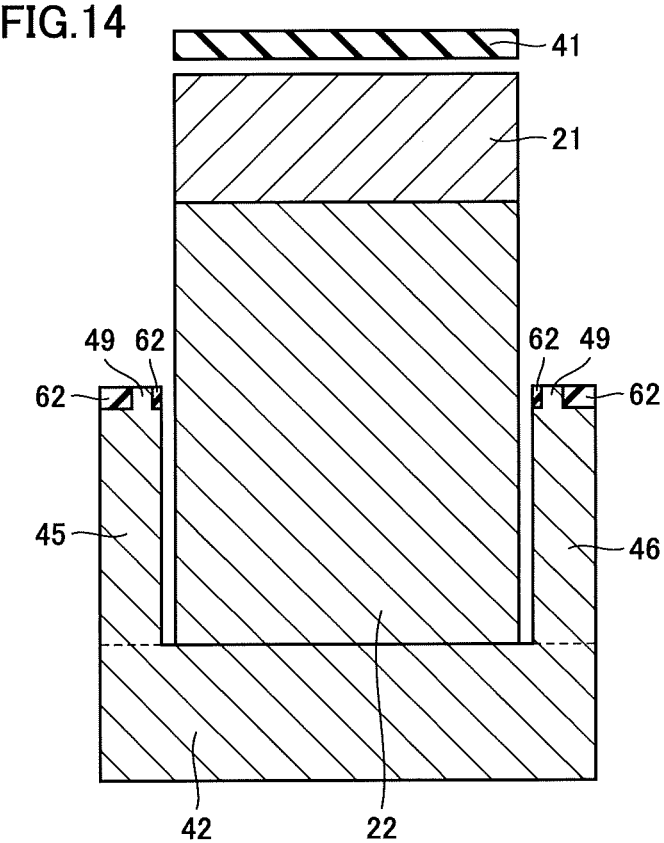
FIG. 14 is a schematic cross-sectional view along line XIV-XIV in FIG. 13 (B) as seen from above.

Referring to FIGS. 13 and 14, in the present embodiment, positioning pins 49 extend through insulating member 62 disposed directly below and in contact with secondary winding 12. Specifically, in FIG. 13 (B), through holes are formed in a part of insulating member 62 and positioning pins 49 extend through the through holes.

Positioning pins 49 form a single body together with sidewall 45/46. Positioning pin 49 extends through insulating member 62, and accordingly insulating member 62 is fixed to and in contact with the positioning pin so that insulating member 62 is not displaced in parallel with sidewall 45/46 as seen in plan view.

In FIG. 13 (A), a part of secondary winding 12 extends upward in FIG. 11 toward printed circuit board 41 to form extension 14 that is passed through and secured to printed circuit board 41, and this upwardly extending part of secondary winding 12 extends through insulating member 63. Secondary winding 12 is disposed lower than primary winding 11 and insulating member 63 and therefore not shown in FIG. 13 (A). In other words, a through hole is formed in a part of insulating member 63 and secondary winding 12 extends through this through hole to form extension 14. The fact that secondary winding 12 extends through insulating member 63 and has extension 14 secured to printed circuit board 41 is also seen from FIGS. 11 and 12.

Extension 14 extends through insulating member 63 and printed circuit board 41, and accordingly insulating member 63 is fixed to and in contact with extension 14 so that insulating member 63 is not displaced in parallel with extension 14 and printed circuit board 41 as seen in plan view.

In the present embodiment, at least a part of insulating members 61, 62, 63 that are the first insulating member is secured to and in contact with an associated member (such as positioning pin 49 and extension 14) extending through associated insulating member 61, 62, 63, and accordingly secured to sidewall 45, 46 or printed circuit board 41.

In this way, positional displacement of insulating members 61, 62, 63 can be suppressed. Plate-shaped insulating members 61, 62, 63 are at least partially secured to and in contact with sidewalls 45, 46 (see FIG. 14), and accordingly the insulating member is located between windings 11, 12 and sidewalls 45, 46. In this way, contact between windings 11, 12 and sidewalls 45, 46 can be suppressed.

The configuration having above-described positioning pins 49 may be applied to the first and second embodiments.

Functions and advantages of the power converter in the present embodiment are now described. The present embodiment in which windings 11, 12 are bent in C shape can also achieve downsizing of power converters 300, 301, electrical insulation between windings and between windings and cores, and heat dissipation from the windings, basically similarly to the case where windings 11, 12 are bent in S shape as in the first embodiment.

Next, the electrical insulation property for each component of transformer 10 in the present embodiment is described. In the present embodiment as well, insulating members 61, 62, 63 provide electrical insulation between windings for example, basically similarly to the first and second embodiments.

Referring again to FIG. 11, in the present embodiment, leftmost end 62A of insulating member 62 is formed to extend leftward further than the leftmost end of sidewall 45, and rightmost end 62A of insulating member 62 is formed to extend rightward further than the rightmost end of sidewall 46. Accordingly, a gap is formed in the region between sidewall 45 and the adjacent first portion of secondary winding 12 and a gap is formed in the region between sidewall 46 and the adjacent second portion of secondary winding 12. The gaps are filled with a material with high flowability fed in the gaps to form high-heat-dissipation insulating member 64, after the members such as windings 11, 12 forming transformer 10 are placed in the region enclosed by sidewalls 43, 44, like the first embodiment. The method for assembling power converter 300 in the present embodiment is basically similar to the method for assembling power converter 100 in the first embodiment in FIG. 8.

In the present embodiment, bottommost end 63A of insulating member 63 extending in the top-bottom direction in FIG. 11 between respective first portions of windings 11, 12 is formed to extend downward further than respective bottommost portions of the first portions of windings 11, 12. Bottommost end 63A of insulating member 63 extending in the top-bottom direction in FIG. 11 between respective second portions of windings 11, 12 is formed to extend downward further than respective bottommost portions of the second portions of windings 11, 12. Accordingly, gaps are formed and can be filled with high-heat-dissipation insulating member 64.

In the present embodiment as described above, positioning pins 49 protruding from sidewalls 45, 46 for example extend through insulating member 62 so as to secure insulating member 62 so that insulating member 62 is not moved laterally and rearward. Accordingly, electrical insulation between windings for example is more reliably maintained.

Next, the heat dissipation property for each component of transformer 10 in the present embodiment is described.

Heat generated from the first and second portions of secondary winding 12 is transferred from their surfaces facing sidewalls 45, 46 and dissipated to sidewalls 45, 46 through high-heat-dissipation insulating member 64. The shorter the distance between secondary winding 12 and its facing sidewalls 45, 46, the higher the heat dissipation property from secondary winding 12 to sidewalls 45, 46. The longer the distance, the lower the heat dissipation property from secondary winding 12 to sidewalls 45, 46. When the position of secondary winding 12 is displaced leftward for example relative to FIG. 11, the first portion (lower left portion) of secondary winding 12 is located further from sidewall 45, while the second portion (lower right portion) thereof is located closer to sidewall 46. On the contrary, when the position of secondary winding 12 is displaced rightward for example relative to FIG. 11, the second portion (lower right portion) of secondary winding 12 is located further from sidewall 46, while the first portion (lower left portion) thereof is located closer to sidewall 45. Thus, even when secondary winding 12 is positionally displaced leftward or rightward, the average distance between secondary winding 12 and sidewalls 45, 46 remains the same, and the overall heat dissipation property does not deteriorate.

Heat generated from the first and second portions of primary winding 11 is transferred from their surfaces facing sidewalls 44, 43 and dissipated to sidewalls 44, 43 through high-heat-dissipation insulating member 64. The shorter the distance between primary winding 11 and its facing sidewalls 44, 43, the higher the heat dissipation property from primary winding 11 to sidewalls 44, 43. The longer the distance, the lower the heat dissipation property from primary winding 11 to sidewalls 44, 43. When the position of primary winding 11 is displaced leftward for example relative to FIG. 11, the second portion (lower right portion) of primary winding 11 is located further from sidewall 43, while the first portion (lower left portion) thereof is located closer to sidewall 44. On the contrary, when the position of primary winding 11 is displaced rightward for example relative to FIG. 11, the first portion (lower left portion) of primary winding 11 is located further from sidewall 44, while the second portion (lower right portion) thereof is located closer to sidewall 43. Thus, even when primary winding 11 is positionally displaced leftward or rightward, the average distance between primary winding 11 and sidewalls 44, 43 remains the same, and the overall heat dissipation property does not deteriorate.

In the present embodiment, high-heat-dissipation insulating member 64 is formed not only in the region outside windings 11, 12 but also in the region inside windings 11, 12, and thus high-heat-dissipation insulating member 64 is formed on both the left side and the right side of the first and second portions of windings 11, 12. The present embodiment therefore has a feature that the heat dissipation property is not deteriorated even when primary winding 11 for example is positionally displaced leftward or rightward as described above.

The features of respective configurations of the embodiments may be combined appropriately within a technically consistent scope. For example, the configuration of the third embodiment in which windings 11, 12 are bent in C shape may be combined with the configuration of the second embodiment in which sidewalls 43, 44 are joined to casing 42.

It should be construed that embodiments disclosed herein are given by way of illustration in all respects, not by way of limitation. It is intended that the scope of the present invention is defined by claims, not by the description above, and encompasses all modifications and variations equivalent in meaning and scope to the claims.

REFERENCE SIGNS LIST 1 input-side drive circuit;
2 output-side drive circuit;
10 transformer;
11 primary winding;
11A, 11B, 12A, 12B connecting point;
11C, 12C, 61C, 62C, 63C opening;
11E1, 12E1 bottommost portion;
11E2, 12E2 topmost portion;
11T1, 12T1 first bent portion;
11T2, 12T2 second bent portion;
12 secondary winding;
13, 14 extension;
21 upper magnetic core;
22 lower magnetic core;
31A, 31B, 31C, 31D switching element;
31E, 31F, 31G, 31H rectifying element;
32A, 32B capacitor;
33 coil;
41 printed circuit board;
42 casing;
43, 44, 45, 46 sidewall;
43A, 44A heat-dissipation grease;
43C, 44C joint portion;
49 positioning pin;
51, 52 screw;
53, 54 interconnection;
61, 62, 63 insulating member;
61A, 62A, 63A end; 64 high-heat-dissipation insulating member;
66 insulating member sheet;
100, 101, 200, 300, 301 power converter

The invention claimed is:

1. A power converter comprising:
a magnetic core;
a plurality of windings each wound around the magnetic core, wherein each of the plurality of windings includes a first bent portion, a second bent portion, a first portion between one end and the first bent portion of the winding, and a second portion between the other end opposite to the one end and the second bent portion of the winding, the one end and the other end being ends relative to a plane extending along a central axis of the windings and from the central axis toward the bent portions, the first and second portions extending parallel to an axis along which the magnetic core extends through a plurality of aligned openings in the plurality of windings, the plurality of windings are each wound multiple turns around the magnetic core in a planar spiral form, from the core toward an outside of the core, and a whole plane formed by each winding of the plurality of windings that is wound multiple turns is bent, while the winding is kept in a state of being wound multiple turns in the planar spiral form, to form the first bent portion and the second bent portion;

a plurality of metal sidewalls disposed outside the plurality of windings and extending in the direction in which the magnetic core extends;

a first insulating member disposed between the plurality of windings and between the windings and the magnetic core; and a second insulating member disposed on an outside of the plurality of windings, the second insulating member being in contact with each of the plurality of sidewalls and each of the plurality of windings, the second insulating member having a thermal conductivity higher than a thermal conductivity of the first insulating member.

2. The power converter according to claim 1, wherein the thermal conductivity of the second insulating member is 0.5 W/mK or more.

3. The power converter according to claim 1, wherein
the plurality of windings are two windings, and
each of the two windings is bent so that a direction in which the first portion extends from the first bent portion is opposite to a direction in which the second portion extends from the second bent portion.

4. The power converter according to claim 3, wherein the second insulating member is disposed on only the outside of the windings, and
each of the two windings having the first bent portion and the second bent portion is disposed to be at least partially in contact with the second insulating member.

5. The power converter according to claim 3, wherein the first insulating member is disposed in
a region between one winding of the two windings and the other winding different from the one winding,
a region between the one winding and the magnetic core; and
a region between the other winding and the magnetic core.

6. The power converter according to claim 5, wherein the first portion of the one winding is disposed outward of the first portion of the other winding,
the second portion of the other winding is disposed outward of the second portion of the one winding, and
the first portion of the one winding and the second portion of the other winding are in contact with the second insulating member.

7. The power converter according to claim 3, further comprising a printed circuit board electrically connected to the windings, wherein
at least a part of the first insulating member is secured to and in contact with a member extending thorough the first insulating member and secured to the sidewalls or the printed circuit board.

8. The power converter according to claim 1, wherein
the plurality of windings are two windings, and
each of the two windings is bent so that a direction in which the first portion extends from the first bent portion is identical to a direction in which the second portion extends from the second bent portion.

9. The power converter according to claim 8, wherein the first insulating member is disposed in
a region between one winding of the two windings and the other winding different from the one winding,
a region between the one winding and the magnetic core, and
a region between the other winding and the magnetic core.

10. The power converter according to claim 1, further comprising a heat dissipater disposed in contact with one end face of the magnetic core in the direction in which the magnetic core extends, wherein the heat dissipater forms a single body together with the plurality of sidewalls.

11. The power converter according to claim 1, further comprising a heat dissipater disposed in contact with one end face and respective end faces of the plurality of sidewalls in the direction in which the magnetic core and the plurality of sidewalls extend, wherein the plurality of sidewalls each include a joint portion contacting the heat dissipater and extending in a direction traversing the direction in which the sidewalls extend.

12. The power converter according to claim 1, wherein the second insulating member is in contact with the portion of at least one of the plurality of windings extending in the direction in which the magnetic core extends.

* * * * *